(12) United States Patent
Pfaff et al.

(10) Patent No.: US 11,883,895 B2
(45) Date of Patent: *Jan. 30, 2024

(54) SYSTEM AND METHODS FOR IMPROVED SHEET METAL CUTTING

(71) Applicant: Worth-Pfaff Innovations, Incorporated, Deerfield, IL (US)

(72) Inventors: Eric Pfaff, Bethesda, MD (US); Ronald K. Worth, Deerfield, IL (US)

(73) Assignee: WORTH-PFAFF INNOVATIONS, INCORPORATED, Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,492

(22) Filed: Jul. 20, 2021

(65) Prior Publication Data

US 2022/0040780 A1 Feb. 10, 2022

Related U.S. Application Data

(63) Continuation of application No. 16/356,407, filed on Mar. 18, 2019, now Pat. No. 11,084,117, which is a continuation of application No. 15/345,208, filed on Nov. 7, 2016, now Pat. No. 10,259,070.

(60) Provisional application No. 62/252,272, filed on Nov. 6, 2015.

(51) Int. Cl.
*G05B 99/00* (2006.01)
*B23K 10/00* (2006.01)
(Continued)

(52) U.S. Cl.
CPC ............ *B23K 10/006* (2013.01); *B23K 10/00* (2013.01); *B23K 26/0626* (2013.01);
(Continued)

(58) Field of Classification Search
CPC .......................................... G05B 2219/49111
See application file for complete search history.

(56) References Cited

U.S. PATENT DOCUMENTS 5,091,861 A 2/1992 Geller
5,326,955 A 7/1994 Nishi et al.
(Continued)

FOREIGN PATENT DOCUMENTS

EP 0579841 A1 1/1994
JP H10314950 A * 12/1998
WO WO-9316422 A1 * 8/1993 ....... G05B 19/40937

*Primary Examiner* — Suresh Suryawanshi
(74) *Attorney, Agent, or Firm* — Patzik, Frank & Samotny Ltd.

(57) ABSTRACT

A plasma cutting system for measuring or monitoring the voltage between a plasma torch and the material being cut to determine a voltage or voltage signature and comparing that measurement against predetermined values to indicate that an initial pierce of the material is complete, and based on the measurement, moving the torch or the material to a different location for additional cutting. The system further provides a Fix Drawing Tool, which will automatically detect and fix gaps or overlaps in a drawing that are very difficult to find visually. These gaps and overlaps become a problem when trying to make a proper toolpath because a CAM program requires a clean, closed shape. The system also provides a Dynamic Corner Looping system, which automatically adjusts with the feed-rate and accelerations of the toolpath and plasma machine, eliminates unwanted dross, sharpens corners and minimizes material loss. A pendant tethering system is also disclosed for managing control of a CNC machine remotely. Additional disclosed functionality includes a data collection system, a manual hand wheel with 3D simulation and a multiple fabrication head management system.

15 Claims, 28 Drawing Sheets

(51) Int. Cl.
  *G05B 19/19* (2006.01)
  *B23K 26/06* (2014.01)
  *B23K 26/08* (2014.01)
  *B23K 37/02* (2006.01)
  *B23K 26/38* (2014.01)
(52) U.S. Cl.
  CPC .......... *B23K 26/0876* (2013.01); *B23K 26/38* (2013.01); *B23K 37/0235* (2013.01); *G05B 19/19* (2013.01); *G05B 2219/49111* (2013.01)

(56) References Cited

U.S. PATENT DOCUMENTS

| | | |
|---|---|---|
| 5,653,895 A | 8/1997 | Shintani |
| 6,317,646 B1 | 11/2001 | de Caussin |
| 6,326,583 B1 | 12/2001 | Hardwick et al. |
| 6,428,252 B1 | 8/2002 | Oldani |
| 6,947,802 B2 | 9/2005 | Picard et al. |
| 7,071,441 B1 | 7/2006 | Bulle |
| 8,511,172 B2 | 8/2013 | Smith |
| 8,525,067 B2 | 9/2013 | Muscat-Tyler et al. |
| 8,717,383 B2 | 5/2014 | Coldicott |
| 2010/0087949 A1 | 4/2010 | Coleman |
| 2011/0305849 A1* | 12/2011 | Presswood, Jr. ....... A47G 33/08 362/249.14 |
| 2013/0319978 A1* | 12/2013 | Wood ..................... B23K 10/00 219/121.44 |
| 2014/0091511 A1 | 4/2014 | Martin |
| 2014/0209574 A1 | 7/2014 | Walsh |
| 2014/0297021 A1 | 10/2014 | Aggarwal |
| 2015/0127139 A1 | 5/2015 | Bolin |
| 2015/0129563 A1 | 5/2015 | Hodges |

* cited by examiner

SYSTEM AND METHODS FOR IMPROVED SHEET METAL CUTTING

FIELD OF THE INVENTION

The present application is a continuation of and claims priority to U.S. Non Provisional patent application Ser. No. 16/356,407, filed Mar. 18, 2019, now allowed, which is a continuation of and claims priority to U.S. Non-Provisional patent application Ser. No. 15/345,208, filed Nov. 7, 2016, now U.S. Pat. No. 10,259,070 issued Apr. 16, 2019, which is a continuation of and claims priority to U.S. Provisional Patent Application Ser. No. 62/252,272, filed Nov. 6, 2015. These applications are hereby incorporated by reference in their entirety.

BACKGROUND OF THE INVENTION

It is known to use a plasma cutter to cut a material, such as, for example only, steel, sheet metal, aluminum, and the like. In general, plasma cutting is performed by projecting an inert gas or compressed air from a source through a plasma torch nozzle towards the surface of the material to be cut, and simultaneously driving an electrical current through the gas or air by applying a voltage between the cutter and the material to form a plasma within the projected gas or air. The generated plasma is hot enough that it can be used to cut a variety of different materials. Other sheet metal cutting methods include laser cutting, waterjet cutting and oxy-fuel cutting.

In general plasma cutting systems typically include a power supply, ground, and a torch and can be used manually to cut the material. However, Computer Numerical Controlled (CNC) plasma cutting systems employ additional hardware and software to facilitate automated and often more precise material cutting. An exemplary system uses control hardware and software along with rails, carriages, gantries and stepper or servo motors to control the motion along the movement axis for precision cutting. Exemplary embodiments of a plasma cutter and material are shown in FIGS. 1 and 2.

When a plasma cutter first turns on and begins cutting a material, it takes time for the plasma jet to pierce through the material (i.e., to achieve an adequate Z-plane depth of the cut). During this time, the plasma needs to stay stationary with respect to the material before it can be moved to continue the cutting of the material (i.e., in the XY plane). The time for this initial piercing can vary according to the properties and thickness of the material to be cut, along with the characteristics of the plasma cutting device, such as, the power of the plasma system, nozzle geometry, and other factors.

One known method for determining the amount of time for this initial piercing to occur is to estimate the amount of time based on past experimental data, which can be then used to create a look-up table based on the characteristics of the material and of the plasma cutting system. However, such look-up tables can be imprecise resulting in insufficient cutting. If the time given in the table is too long, there will be a larger-than-desired dilated hole at the beginning of the cut. If the time in the table is too short, the plasma may not cut all the way through the material at the beginning of a cut. Also, the look-up table may not take into account variable thicknesses in the material being cut.

Another disadvantage of current sheet metal cutting systems and methods is that once a drawing or design is created on a Computer Aided Design (CAD) system, there may be defects in the design that are difficult to locate or find. For example, based on the resolution of a monitor and the complexity of the design, it may be difficult to find gaps or overlaps where two lines seem to connect, but in actuality, do not. These gaps an overlaps become a problem when trying to make a proper toolpath because a CAM program requires a clean, closed shape when making a toolpath. It would be advantageous for a system to include functionality that can automatically (or semi-automatically) detect and fix these gaps and/or overlaps in a drawing that are very difficult and tedious to find visually.

Yet another disadvantage of current plasma cutting systems and methods occurs at the junction of two lines, for example at a corner of a square. In a typical plasma cutting application, the quality of the cut is dependent on a constant feed-rate of the plasma torch as it cuts. Because the torch needs to slow down at these corners, there is a degradation of the quality of the cut along dross buildup at each corner. It would be advantageous for a system to include functionality that can automatically (or semi-automatically) determine where these corners will occur and using the system information, including feed-rate and machine acceleration limits, determine the optimal path to minimize inferior plasma cuts. The same methodology can be used to improve the quality of corners in other cutting methods such as laser, waterjet and oxy-fuel cutting.

Another disadvantage of current sheet metal cutting systems, multi axis CNC technologies, robotic technologies and methods is the dangerous use of wireless phone applications to control a plasma cutter, milling machine or other cutting machine. If the user inadvertently leaves the room where the machining equipment resides, the equipment may continue to operate creating a dangerous situation. It would be advantageous for a system to include functionality that can automatically shut down equipment or pass control to another user when the user (using a mobile application) leaves the vicinity or the room.

Accordingly, there is a need for an improved system, device, and method for providing improved functionality for CAD/CAM/CNC systems.

SUMMARY OF THE INVENTION

The present invention utilizes the voltage across the plasma arc, i.e., between the plasma torch and the material being cut, for determining the appropriate timing for moving the plasma torch with respect to the material being cut. The present disclosure contemplates that a complete pierce of the material is generally accompanied by a particular voltage signature, for example, a sharp decrease in the voltage across the plasma arc, a known discrete voltage value, or a rate of change of the voltage. Thus, the present invention involves monitoring the voltage between a plasma torch and the material being cut, and moving the plasma torch, with respect to the material, when a particular voltage signature, such as a predetermined threshold or decrease in voltage, is detected.

The present invention further discloses a Fix Drawing Tool, which will automatically detect and fix gaps or overlaps in a drawing that may be very difficult to locate or find visually. These gaps and overlaps can become a problem when trying to make a proper toolpath, because a CAM program requires a clean, closed shape to make a toolpath.

The present invention further discloses an integrated CAD/CAM/CNC system in which full knowledge of the dynamics of the entire system can be utilized to precisely calculate the length of a corner loop to control the acceleration/deceleration zone outside of the part to be cut to generate sharp corners. The system can utilize formulas, for example, for stopping distance, and other calculations, which can be used to minimize the length of a corner loop, thus maximizing material usage while maintaining good cut quality.

The present invention further discloses a Bluetooth beacon for shutting down equipment or passing control to another user if an operator using a mobile device to operate the equipment leaves the predetermined vicinity or leaves the room.

Additionally, the present invention discloses functionality for a data collection system in an analog feedback control system, such as a CNC machine, for playback at a later time for analysis, verification and technical support services.

The present invention also discloses a three dimensional display system when a user of a CNC machine is using the machine in manual or manual hand wheel mode. The manual hand wheel simulation system provides a real-time display of the movement of the process displaying the X, Y and Z position and can also show a three dimensional display of the part being machined even if it is not actually being cut. This provides for information to the user and also can be used as a teaching tool without wasting material.

The present invention also discloses a fabrication head management system to manage multiple fabrication heads whether in the CAD, CAM or CNC stage of the project. The fabrication head management system can use the information developed in the CAD stage, in the CAM stage, or in the CNC stage to manage which type of fabrication head (and also which of the same fabrication head types) should be used at what time in the process.

Additional objectives and advantages of the present disclosure will become apparent to one having ordinary skill in the art after reading the specification in light of the drawing figures, however, the spirit and scope of the present invention, including the appended claims, should not be limited to the description of the embodiments contained herein.

BRIEF DESCRIPTION OF THE DRAWINGS

The preferred embodiments of the invention will be described in conjunction with the appended drawings, which illustrate and do not limit the invention, where like designations denote like elements, and in which.

DETAILED DESCRIPTION OF THE INVENTION

In general, plasma cutting is performed by projecting an inert gas or compressed air from a plasma torch nozzle towards the surface of the material to be cut, and driving an electrical current through the gas by applying a voltage between the cutter and the material to form a plasma within the projected gas. The plasma is hot enough that it can be used to cut a variety of different materials.

Figure 1:
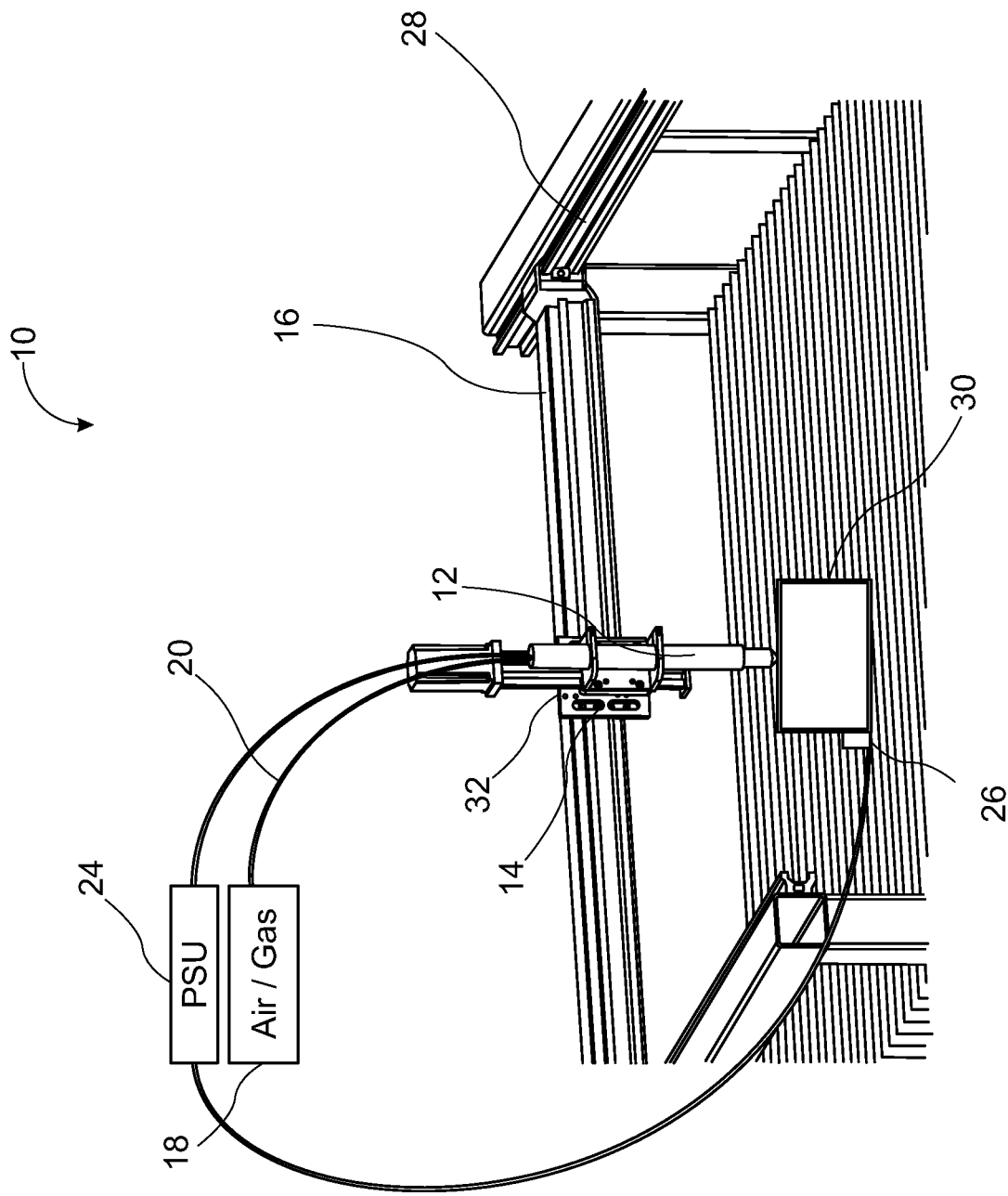
FIG. 1 is a plasma cutting machine with a plasma torch and material that has been cut.

FIG. 1 shows an exemplary plasma cutting system 10 for cutting different types of materials as described herein. The plasma cutting system 10 includes a plasma torch 12 along with the torch carriage assembly 14, gantry 16, which allows the torch carriage assembly 14 to move along an axis, a rail system 28 for moving the gantry 16 and torch carriage assembly 14 along a different axis, an air/gas supply 18, a flexible conduit 20 for air or gas delivery to the plasma torch 12, a power supply 24, and a ground clamp 26, all for use in cutting material 30 using the plasma cutting system 10.

Figure 2:
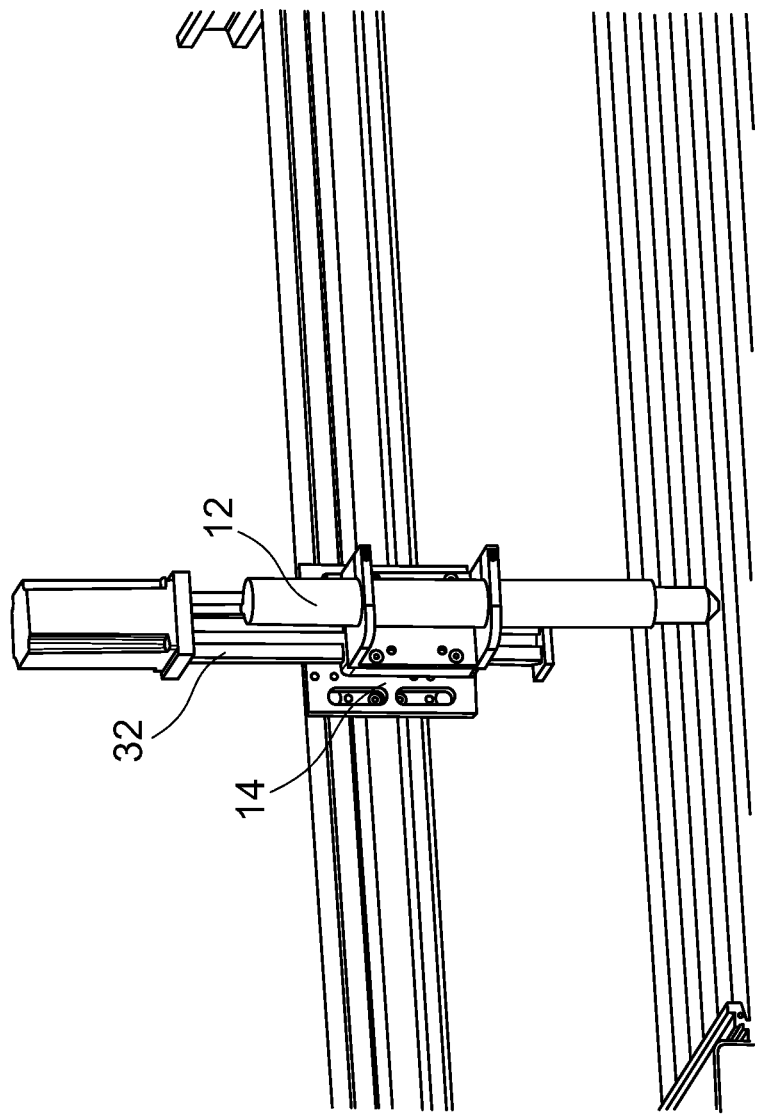
FIG. 2 is a plasma torch on material to be cut.

FIG. 2 shows a close up view of the plasma cutting system 10 in which the plasma torch 12 is positioned normal to the cut material 30. In this exemplary system, the gantry 16 moves in the X direction and the rails 28 move in the Y direction. The carriage gantry 32 moves the plasma torch 12 in the Z direction or the axis normal to the cutting surface 30.

When the plasma torch 12 first turns on, it takes time for the plasma to pierce through the material (i.e., to achieve an adequate Z-plane depth of the cut). The plasma needs to stay stationary during this time before it can move parallel to the plane of the material (i.e., in the XY plane) to continue the cut. The torch stays stationary until the material 30 is pierced. The present invention monitors the voltage between the plasma torch 12 and the material 30 (the plasma arc voltage), for a particular voltage signature, a sharp decrease in the voltage across the plasma arc, a known discrete voltage value, or a rate of change of the voltage. Thus, the present invention involves monitoring the voltage between a plasma torch and the material being cut, and moving the plasma torch 12 upon a particular predetermined value or signature, such as a discrete threshold or decrease in voltage.

Figure 3:
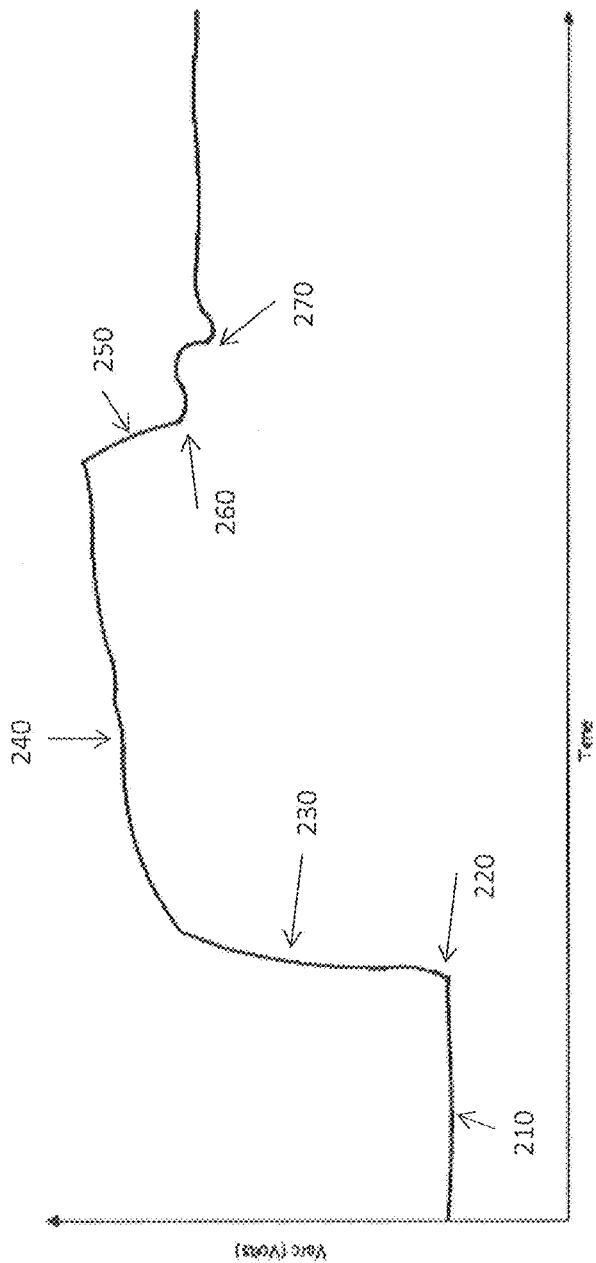
FIG. 3 is a voltage versus time graph illustrating an exemplary voltage between a plasma cutter and a material being cut before, during, and after an initial piercing of the material.

FIG. 3 is a graph indicating a voltage between a plasma torch 12 and a material being cut 30, the plasma arc voltage ($V_{arc}$) before, during, and after cutting the material. Initially after the material has been located in the XY plane, the plasma torch 12 is moved in the Z plane to the appropriate height for an initial pierce of the material 210. The torch carriage assembly 14 is positioned along the gantry 16 movement axis, and the gantry 16 is positioned along the rail movement axis 28. In the exemplary system shown in FIG. 1, the gantry 16 movement axis is the X axis and the rail movement axis 28 is the Y axis. The pierce height is then adjusted to a predetermined level using the carriage gantry 32.

The plasma torch 12 is then activated to begin the initial pierce 220. In doing so, the power supply 24 supplies power to the plasma torch electrode (not shown). The inert gas or compressed air passing through the plasma torch 12 is then subjected to the voltage creating an arc. Once heated to the proper temperature an inert gas or compressed air changes to a plasma that is forced towards the cut material 30 through the plasma torch 12.

The arc voltage is then measured and used to determine whether or not the pilot arc ignition has been started 230. As described below, the measurement is compared to a predetermined value and/or the change in voltage over time is compared to a predetermined differential value. For example, the measured voltage at this time may be about −130V. As known by one having ordinary skill in the art, the voltage measurement may be positive or negative and the comparison can be done using absolute values if desired.

To the extent the pilot arc ignition has been started, the voltage is continued to be measured to detect whether the power amplifier is applying power 240 to the plasma torch 12. As described below, that measurement is compared to a different predetermined value and/or the change in voltage over that time is compared to a different predetermined differential value. For example, the measured voltage at this time may be about −160V.

The voltage continues to be measured (e.g., while driving a constant or predetermined current) for a voltage signature indicating that the pierce drilling is in progress 250. As described in detail below, the voltage measurement at this time is compared to yet another predetermined value and/or the change in voltage over time is compared to another predetermined differential value. In this case, the comparison is to determine when the measured value is less than or equal to the predetermined values.

After the material has been pierced 260, the plasma torch 12 can be moved to the appropriate height in the Z plane for continuous cutting. The voltage measurement at this time generates the set-point 270. The Automatic Torch Height Control (ATHC) system can then be used to maintain z-axis height based on the set-point 270. The plasma cutting procedure can continue for the particular cut based on the set-point 270 until the cutting is complete.

Figure 4:
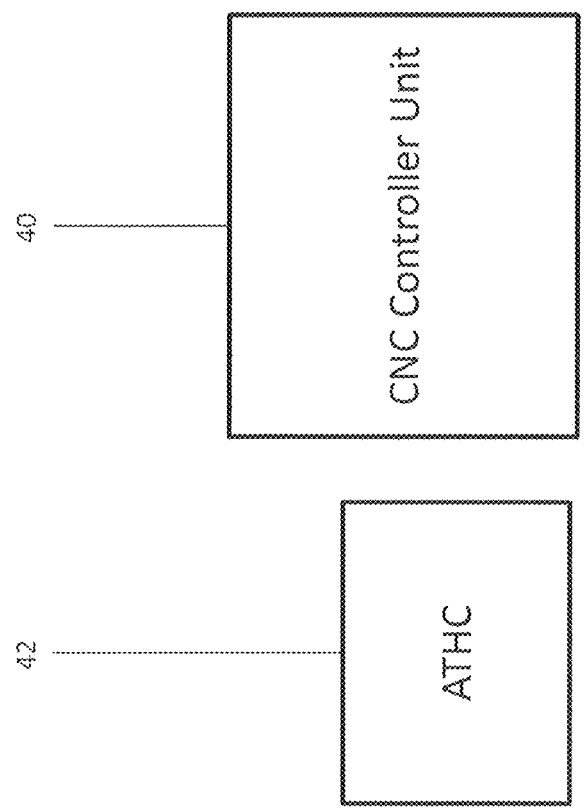
FIG. 4 is an exemplary computer numerical controller and height controller for a plasma cutting device in accordance with the present invention.

FIG. 4 shows a Computer Numerical Controller (CNC) 40 and height controller 42 for a plasma cutting system 10. The height controller can be configured to adjust the height of a plasma torch according to the voltage of the plasma arc, as described herein.

Figure 5:
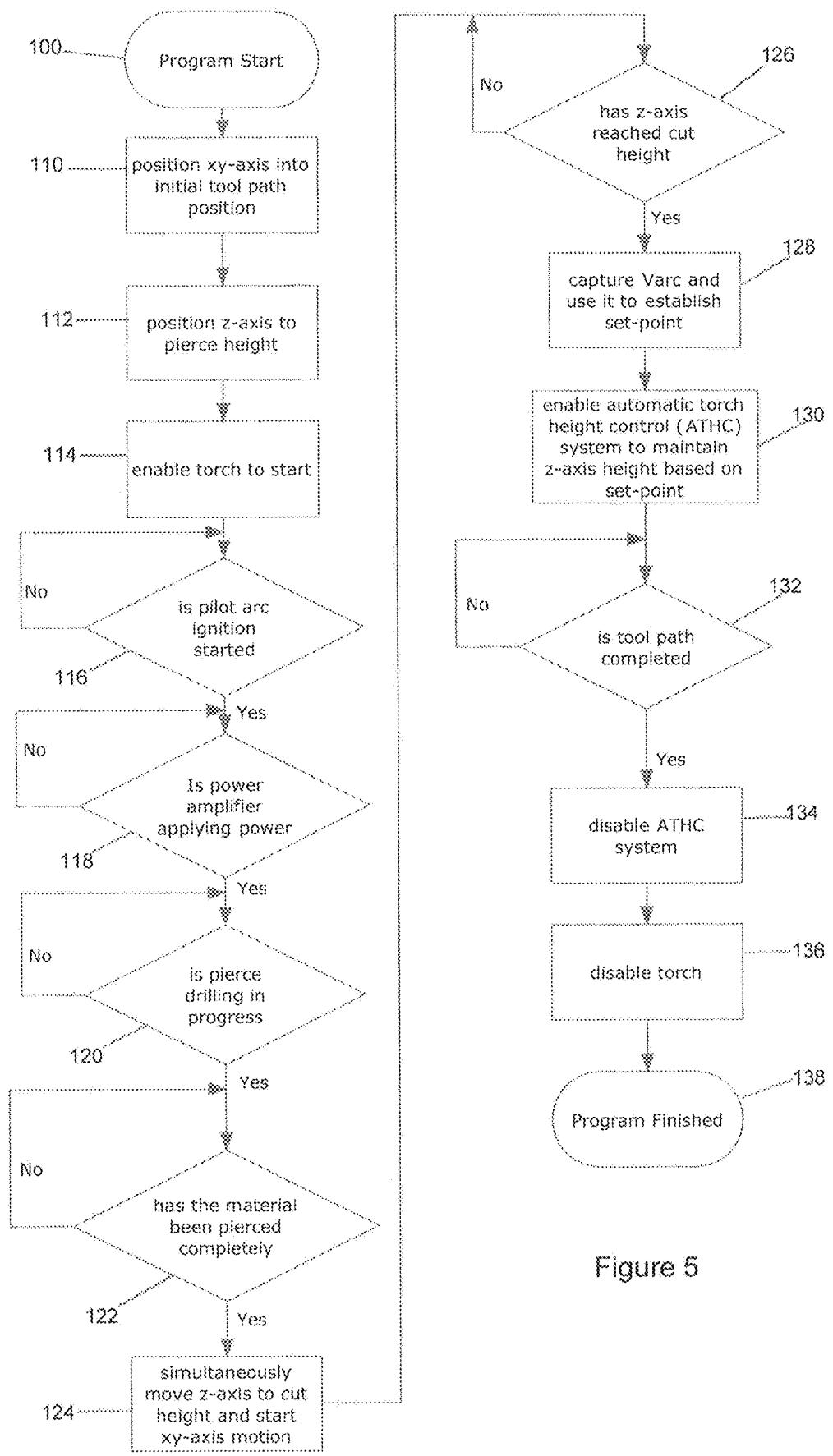
FIG. 5 is a flow chart indicating the steps of an exemplary method of performing a cut of material using a CNC plasma cutting device in accordance with the present invention.

FIG. 5 is a flow chart indicating an exemplary method of performing a cut with a plasma cutter in accordance with the present disclosure and as shown with respect to the exemplary graph shown on FIG. 3. As shown, the plasma cutting system 10 as described above and the program used to assist with the cutting begins the operation of cutting the material at step 100. Initially, the tool is moved into the proper XY position with respect to the material to be cut at step 110, which can be done by moving the material on an XY bed, or moving the plasma torch 12 in relation to the material. This step continues until the plasma torch is in the proper location. Once the plasma torch is in the correct XY location, the movement is stopped and the information may be saved for future use.

Next, the plasma torch 12 can be moved to the initial piercing height, to the extent it is not already in that location, and the plasma torch is moved in the Z-direction to the proper height for the initial pierce of the material at step 112. At this time $t_1$ (see FIG. 3 210), the plasma torch is in the correct XY location and at the correct height Z to begin piercing through the material. These steps can be accomplished in this order, or done in reverse order or performed simultaneously.

The program then turns on the plasma torch at step 114 at time $t_2$ (see FIG. 3 220), and as described above, a gas or air is sent from a source (not shown), through a flexible conduit 20 and through the plasma torch 12 to generate the plasma for cutting.

The plasma cutting program then detects the beginning of the piercing of the material in order to ensure that the pilot arc ignition has been started at step 116 at time $t_3$ (see FIG. 3 230). This is accomplished by measuring the of the arc voltage ($V_{arc}$), the voltage between the plasma torch 12 and the ground clamp 26, coupled to the material being cut. The absolute value of the arc voltage must be greater than or equal to a predetermined $V_3$ voltage for a preset period of time $t_3$. Alternatively (or additionally), the rate of change of $V_{arc}$ for time $t_3$, or the differential of the voltage measurement over time ($dV_{arc}/d_{t3}$) should be greater than or equal to the predetermined differential value of $V_3$. If this does not occur, a failure signal can be sent to the user and the program can go back to rerun the pilot arc ignition test or the system can shut down.

If the pilot arc ignition has been started (step 116), the program then detects that the power amplifier is applying power at step 118 at time $t_4$ (see FIG. 3 240), by again measuring the absolute value of the $V_{arc}$ to determine that it is above or the same as the $V_4$ predetermined voltage and/or that the rate of change of $V_{arc}$ for time $t_4$, or the differential of the voltage measurement over time ($dV_{arc}/d_{t4}$) is greater than or equal to the predetermined differential value of $V_4$. Again, if this does not occur, a failure signal can be sent to the user and the program can go back to rerun the power amplifier test or the system can shut down.

Next, the program detects whether the pierce drilling is in progress at step 120 at time $t_5$ (see FIG. 3 250). In other words, the program determines when the plasma torch 12 is piercing the material at that location. To accomplish this test, again the absolute value of the arc voltage is measured and to see if the arc voltage is less than or equal to the $V_5$ predetermined voltage and/or that the rate of change of $V_{arc}$ for time $t_5$, or the differential of the voltage measurement over time ($dV_{arc}/d_{t5}$) is less than or equal to the predetermined differential value of $V_5$. The program continues to detect this voltage until the measurement equals or is less than the predetermined values.

Next, the program can additionally detect whether the material has been pierced completely at step 122. To accomplish this, the arc voltage is measured to see if $V_{arc}$ is at or below the $V_6$ predetermined voltage and/or the rate of change of the arc voltage ($dV_{arc}/d_{t6}$) has declined to or below a predetermined differential value of $V_6$. Once this occurs the material has been pierced.

Now that the material has been pierced the plasma torch 12 can be moved to the next location with respect to the material at step 124 immediately after time $t_6$ (see FIG. 3 260). As described above, this movement can be in one or more of the X, Y and Z directions, and can occur in any order. The program next determines if the plasma torch is at the proper height for cutting the material at step 126 and will continue to move the plasma torch 12 until it is at the proper location for cutting.

Once the plasma torch 12 is at the proper cut height, the program can determine the arc voltage and use that voltage to establish a set-point for cutting the material at step 128 at time $t_7$ (see FIG. 3 270). Once the set-point is established, the program can proceed at the cut height or it can utilize that set-point with an automatic torch height control (ATHC) system to maintain the height or Z-axis based on that set-point at step 130. The program continues to cut the material until it determines when the plasma torch 12 path or the cut is complete at step 132 and disables the ATHC at step 134, disables or shuts down the plasma torch at step 136 and ends the program at step 138, and gets ready for the next cut.

Exemplary values for a preferred embodiment of a plasma cutting system described herein, such as the Hypertherm Powermax 45, generating 45 amps and cutting through 3/16" mild steel, would be a range for $V_3$ of approximately −50 volts to −100 volts, with an exemplary voltage of about −72 volts, and $t_3$ would be in an approximate range of 0.1 ms to 500 ms, with an exemplary time of 2 ms for determining if the pilot arc ignition has started 116. The system would use as an example a range for $V_4$ of approximately −100 volts to −400 volts, with an exemplary voltage of approximate −260 volts, and $t_4$ would be in an approximate range of 0.2 ms to 20 ms, with an exemplary time of 0.8 ms to determine if the power amplifier was applying power 118. For determining whether the material has been pierced, the system would use as an example a range for $V_5$ of approximately −400 volts to −100 volts, with an exemplary voltage of −320 volts (due to a spike in voltage) and a $t_5$ would be in an approximate range of 0.5 ms to 10 ms, with an exemplary time of 1.2 ms. This exemplary system would detect and maintain a cutting voltage range of between −85 volts to −150 volts, with an exemplary value of −118 volts for example, and use that value with the ATHC until the cut was finished. These values are for exemplary purposes only and will vary based on the type of plasma torch and material used, the applied voltage, among other variables.

Although different functionality is disclosed herein, and in some cases, that functionality is described in conjunction with a particular type of CNC machine, most, if not all of the functionality described herein can be incorporated into all types of CNC machines, for example, plasma, milling, waterjet, laser, oxy-fuel, turning etc. and for all types of CNC functionality, such as cutting, marking, etching, etc.

FIGS. 6 through 14 show the display corresponding to a drawing tool 300 or software for a drawing tool, that corrects or repairs CAD drawing files in which intersecting lines in the file do not meet at exactly the same point or do not intersect exactly as needed for the machine to run the file properly. The correcting tool or Fix Drawing Tool 300, in accordance with the present invention, will automatically detect and fix these gaps or overlaps in a drawing that are very difficult to find visually.

As described herein, there is a need for functionality that will automatically (or semi-automatically) detect and fix gaps and/or overlaps in a drawing or CAD drawing that can be very difficult to find visually. These gaps and overlaps become a problem when trying to make a proper toolpath because CAM programs require clean properly closed shapes to make a toolpath.

Figure 6:
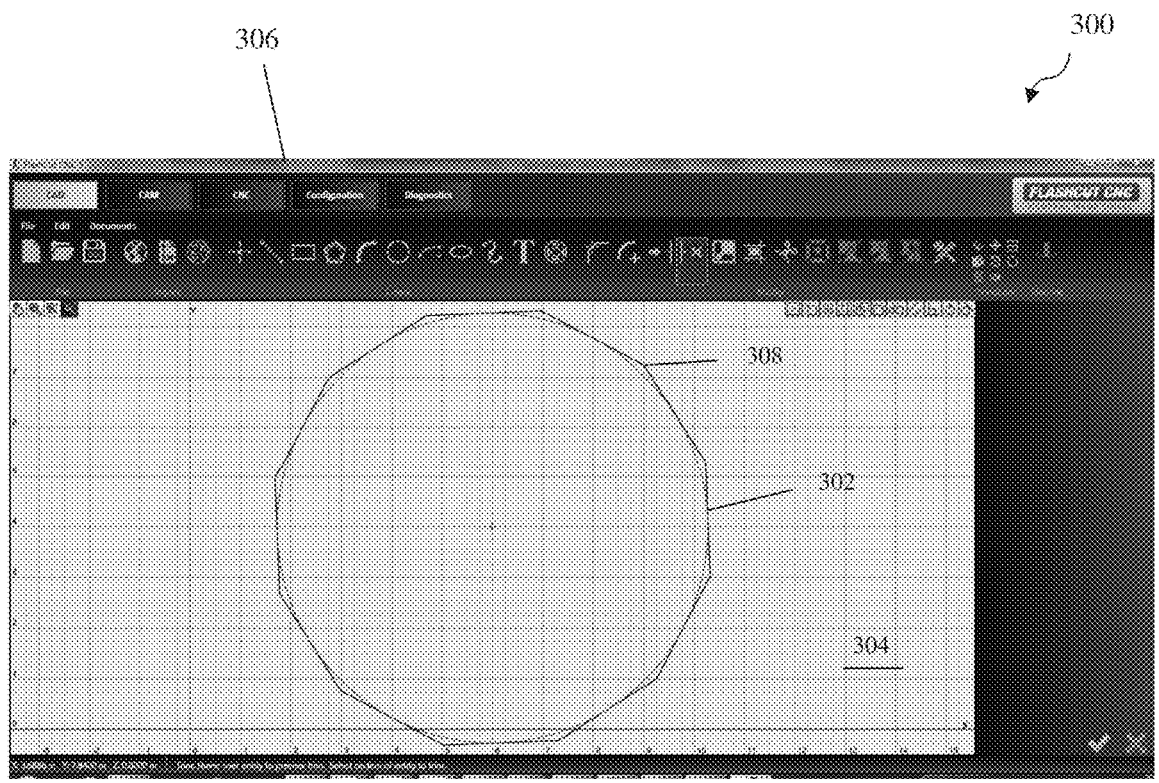
FIG. 6 is a CAD drawing displayed on the monitor of a CAD/CAM/CNC system showing an aspect of the Fix Drawing Tool in accordance with the present invention.

FIG. 6 shows an exemplary drawing shape 302 on the screen or display 304 of a monitor 306. In this case, the drawing shape 302 is a polygon that looks or seems to be a properly closed shape. There are many ways that the polygon shape 302 can be created, as understood by one having ordinary skill in the art, but when a juncture or intersection of two lines is enlarged on the monitor screen 304, a gap 308 in one of the corners is discerned. In some cases, the resolution of the monitor display 304 will determine whether the gap 308 can be seen. In lower resolution monitor displays, a gap 308 may not be visible to the naked eye, while in higher resolution monitors the gap 308 may be visible.

Figure 7:
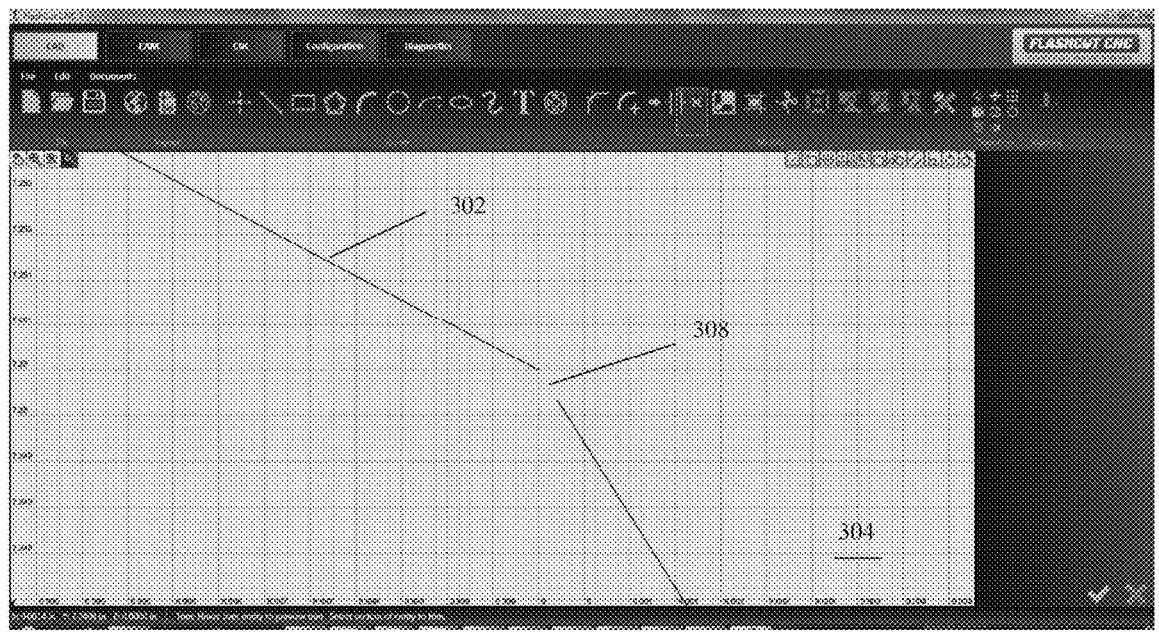
FIG. 7 is a CAD drawing displayed on the monitor of a CAD/CAM/CNC system showing an aspect of the Fix Drawing Tool in accordance with the present invention.

As described herein and shown in FIG. 7, an expanded or zoomed view of the polygon or shape 302 in FIG. 6, the gap 308 can be better seen with the naked eye and, although the gap 308 may be difficult to see and very small, it may prevent the plasma torch 12 (for example) from cutting the proper shape 302, since the drawing shape 302 is not properly closed. It is very difficult for someone to locate exactly where the gap 308 is located so that it can be corrected or fixed.

Figure 8:
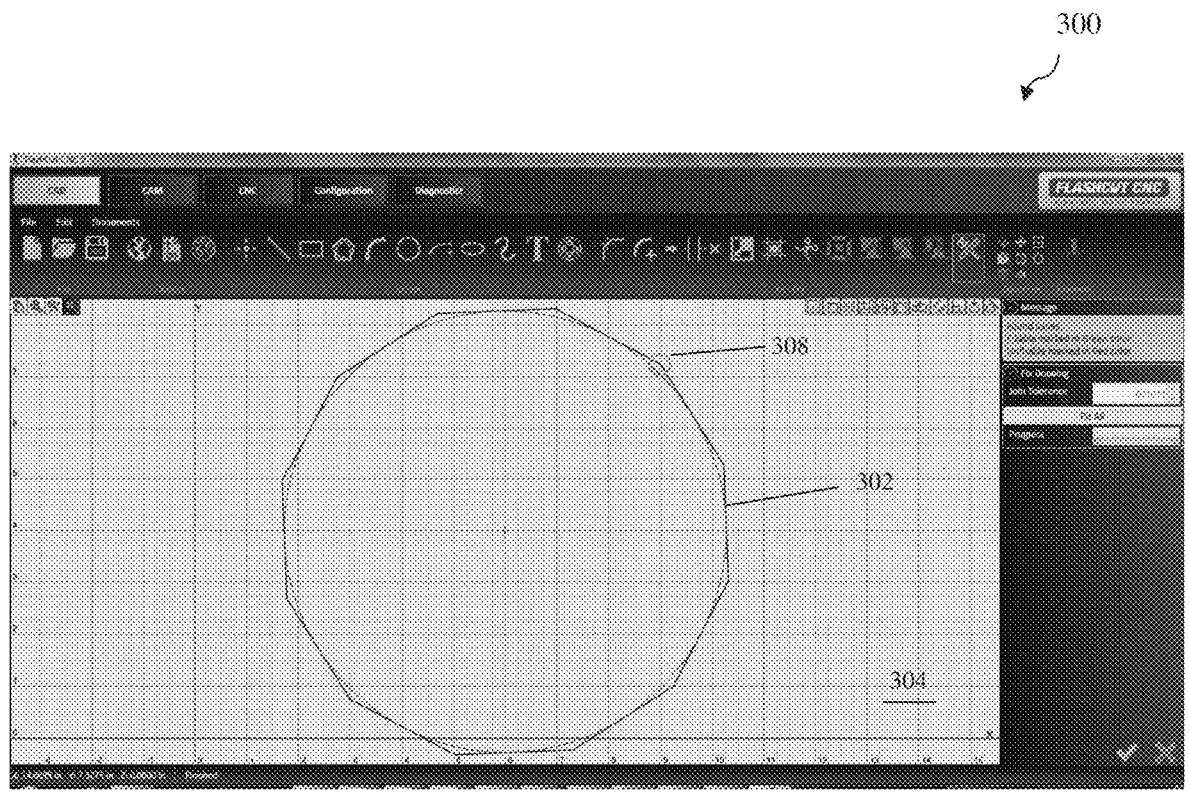
FIG. 8 is a CAD drawing displayed on the monitor of a CAD/CAM/CNC system showing an aspect of the Fix Drawing Tool in accordance with the present invention.

As shown in FIG. 8, the Fix Drawing Tool 300 of the present disclosure will automatically detect gaps 308 (circled in this figure) in the drawing within a specified tolerance and make them so that they can be easily identified. The tolerance will determine which gaps 308 need to be corrected, and will depend on the particular cutting or marking device being used. Further, the tolerance determination can be done manually by the device operator or automatically, based on the fabrication head being used. As such, a particular drawing file 302 may need to correct certain gaps 308 for one fabrication head, but not correct the same gaps 308 for a different fabrication head.

Figure 9:
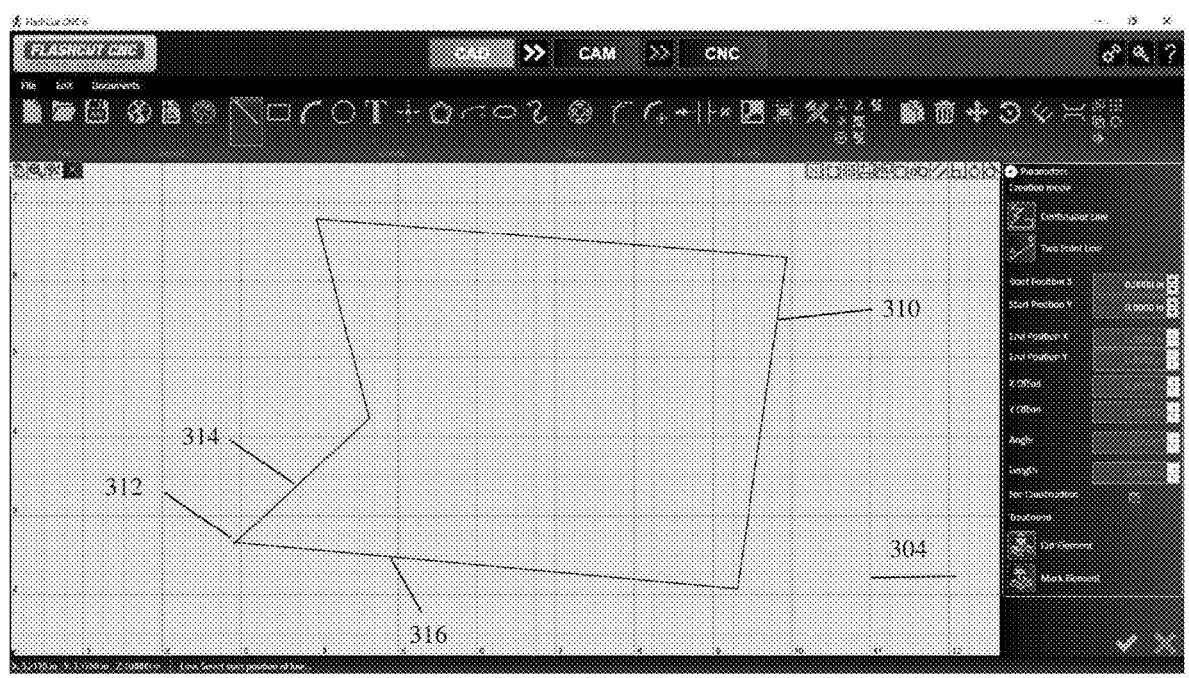
FIG. 9 is a CAD drawing displayed on the monitor of a CAD/CAM/CNC system showing an aspect of the Fix Drawing Tool in accordance with the present invention.

In the same way the Fix Drawing Tool 300 can be used to isolate and correct drawing file defects or gaps 308, the Fix Drawing Tool 300 can be used to detect unwanted extensions and crossing sections at the intersections of lines, arcs, and elliptical or spline segments. Many times these extensions and crossings can be so small that it is impossible to see on a CAD screen without magnifying each intersection, which can be very tedious for the user. FIG. 9 shows a five-sided polygonal shape 310 on the display 304. The shape 310 includes an intersection of a first line 314 and a second line 316 at the lower left corner 312 of the shape 310.

Figure 10:
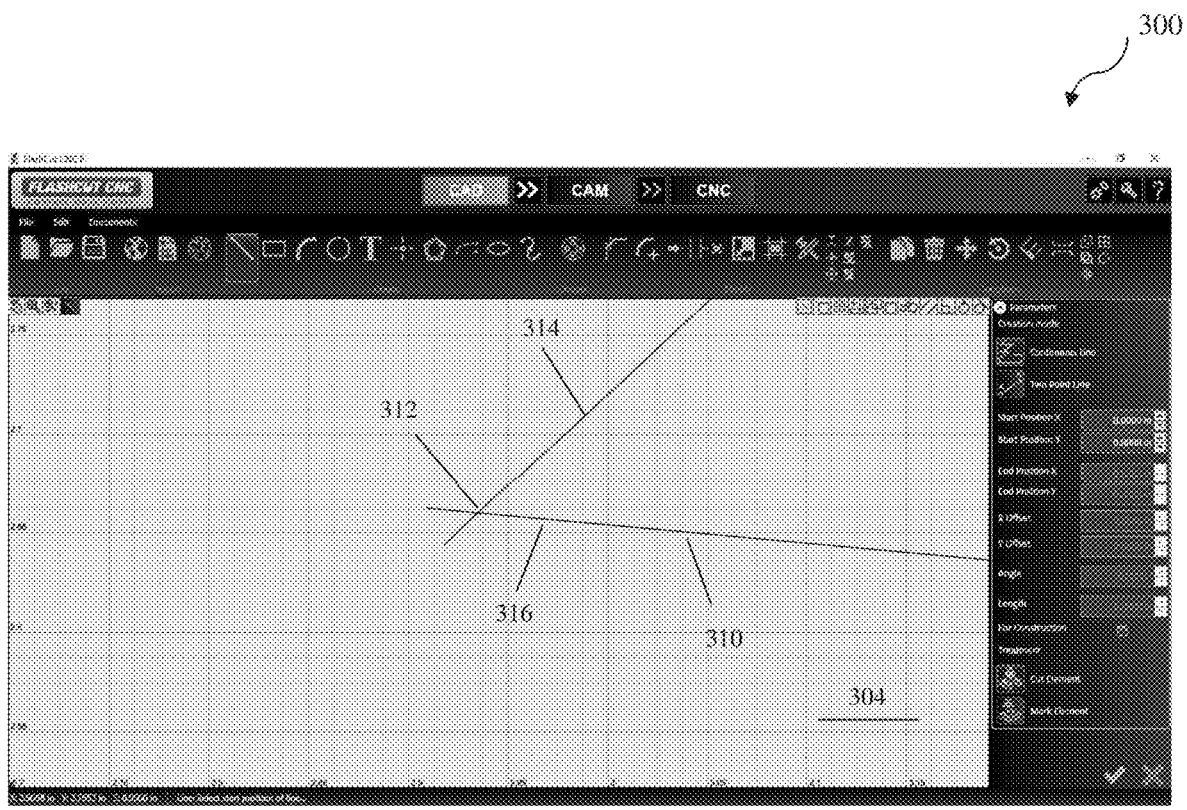
FIG. 10 is a CAD drawing displayed on the monitor of a CAD/CAM/CNC system showing an aspect of the Fix Drawing Tool in accordance with the present invention.

In the normal view on the display 304, the two intersecting lines 312 look as though they end at the same point on the shape 310. FIG. 10 shows the expanded view of the display 304, which includes the intersection 312 of the two lines 314, 316. Clearly, the lines 314, 316 intersect each other, crossover and continue on. This intersection 312 is not visible at the normal magnification on the display 304, but is visible when expanded in FIG. 10. The result of such an extension or crossing at an intersection 312 on a drawing 310 is that the CAM program will not know which way to turn at the intersection 312 or if the overlap of the two lines 314, 316 was intentional or not.

Figure 11:
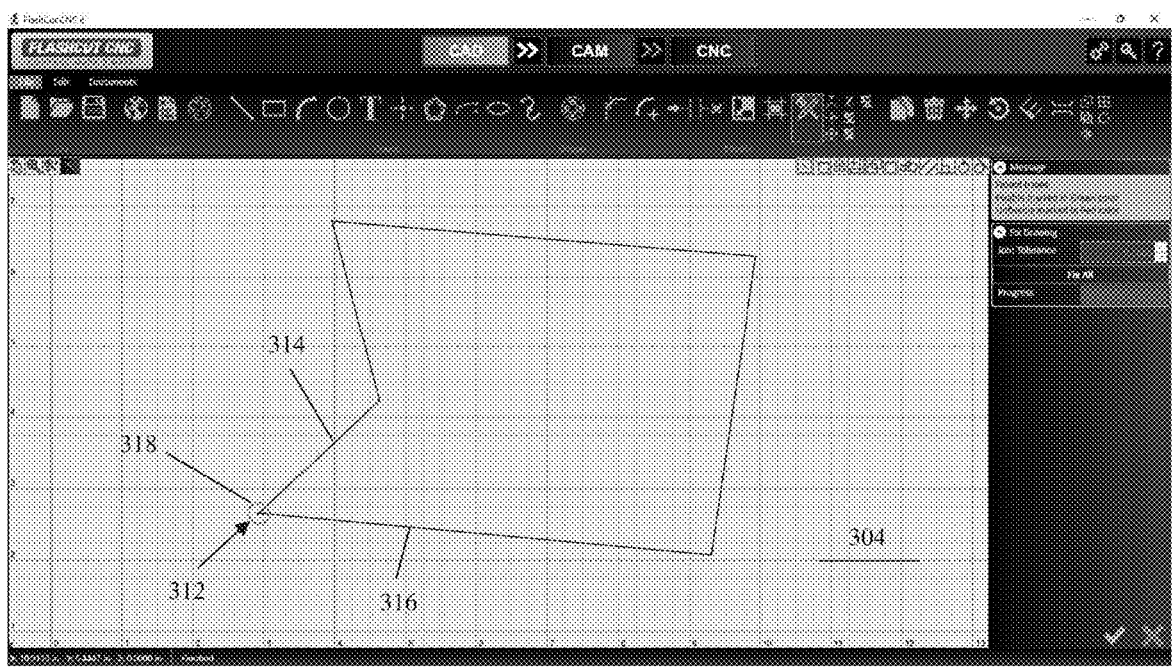
FIG. 11 is a CAD drawing displayed on the monitor of a CAD/CAM/CNC system showing an aspect of the Fix Drawing Tool in accordance with the present invention.

The Fix Drawing Tool 300 can automatically find these intersections 312, extensions or crossings and highlight the intersection 312 with a circle 318, or use different colored lines (not shown) or in any other way that informs the user of the problem, as shown in FIG. 11. This can also be done with locating the gaps 308 described herein.

Figure 12:
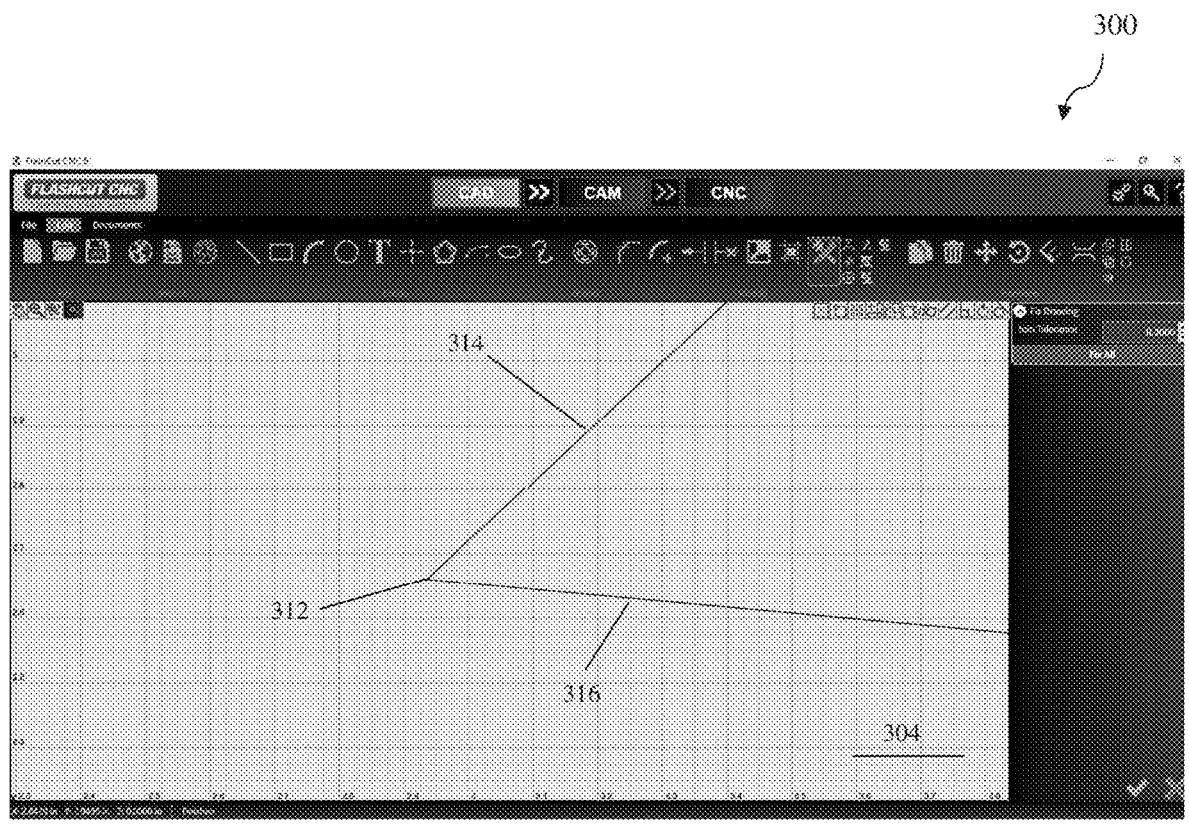
FIG. 12 is a CAD drawing displayed on the monitor of a CAD/CAM/CNC system showing an aspect of the Fix Drawing Tool in accordance with the present invention.

Once the problems are determined and shown, the user has the ability to automatically delete the extended or crossing segments or lines 314, 316, to make clean geometry. The corrections can also be done manually by the user once the problems are displayed on the screen 304. The user also has the option to ignore the problem in the case it was intentional. FIG. 12, an expanded view of the intersection 312 of the first line 314 and the second line 316, shows the corrected intersection 312. The drawing file can now be easily read by a CAM program.

In the same way, the Fix Drawing Tool 300 can be used to detect unwanted overlaps. Many times a drawing file will contain lines, arcs, splines, elliptical arcs, etc. drawn on top of one another, making it difficult to see on a CAD screen 304. In these cases, it is difficult for the CAM program to ascertain if the superfluous geometry was meant to be cut.

Figure 13:
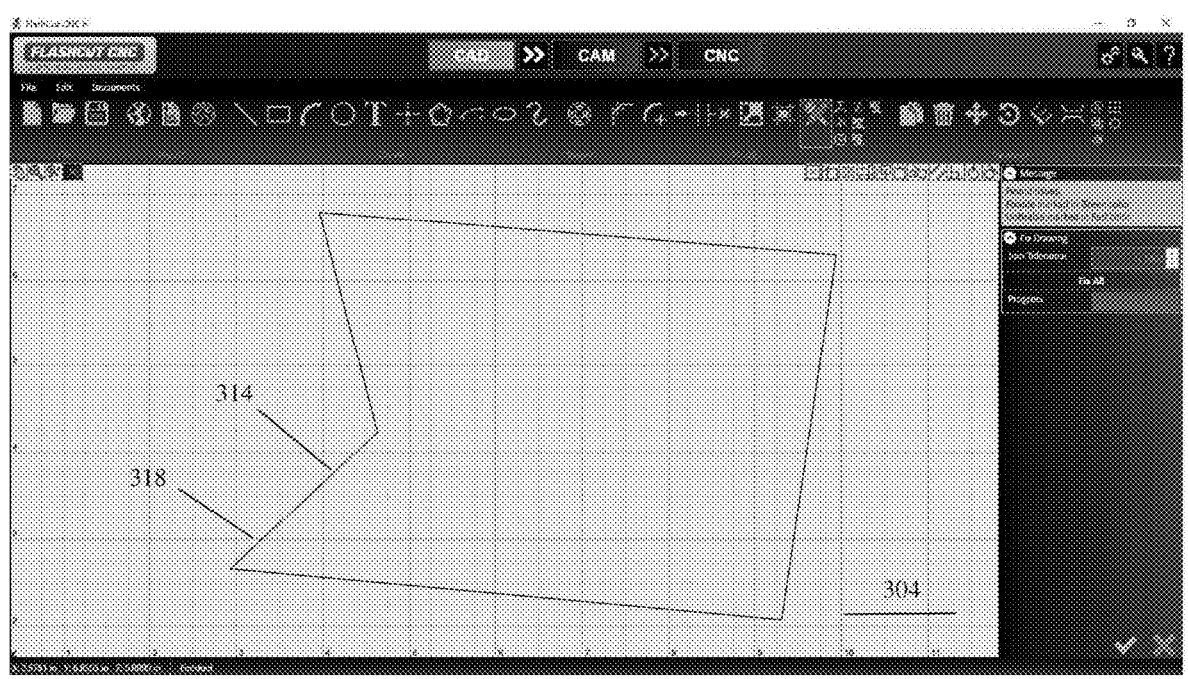
FIG. 13 is a CAD drawing displayed on the monitor of a CAD/CAM/CNC system showing an aspect of the Fix Drawing Tool in accordance with the present invention.

FIG. 13 shows one example of overlapping geometry in which a second line 318 is located directly on the first line 314 of FIGS. 9-12. The Fix Drawing Tool can automatically find this overlapping geometry 318 and highlight it or display it in some manner to the user. Then, the user has the ability to automatically delete the superfluous segment 318 to make clean geometry that can easily be read by a CAM program. The deletion of the segment 318 can also be done manually by the user.

The Fix Drawing Tool 300 can also automatically locate or find problems that are not easy to fix and display those issues by highlighting in a different color, generating a circle around the problem or in other ways make the problem visible to the user for a manual fix.

Figure 14:
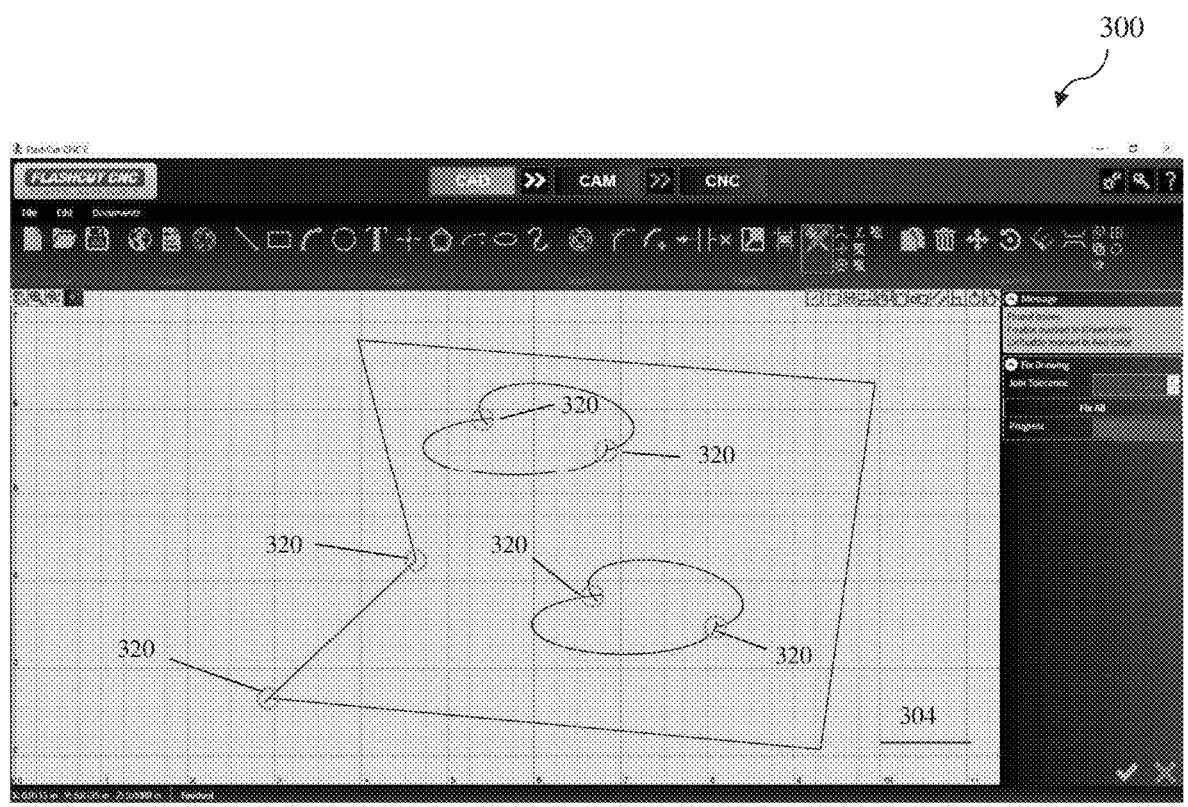
FIG. 14 is a CAD drawing displayed on the monitor of a CAD/CAM/CNC system showing an aspect of the Fix Drawing Tool in accordance with the present invention.

FIG. 14 shows a display after the Fix Drawing Tool 300 has located and displayed many problem issues 320 at once. The Fix Drawing Tool 300 can then automatically correct or fix each of the problems individually or all at once.

The present invention also includes functionality for a Dynamic Corner Looping system 400, which automatically adjusts with the feedrate and acceleration of the toolpath and plasma torch 12, eliminates unwanted dross, sharpens corners and minimizes material loss, as described herein. In a typical plasma cutting application using a plasma torch 12, the quality of the cut is dependent on a constant feedrate of the plasma torch 12 as it cuts through the material. Because the torch 12 must slow down at the corners, there is a degradation of the quality of the cut due to dross buildup at each corner. Similar issues can occur in waterjet and laser CNC systems.

Figure 15:
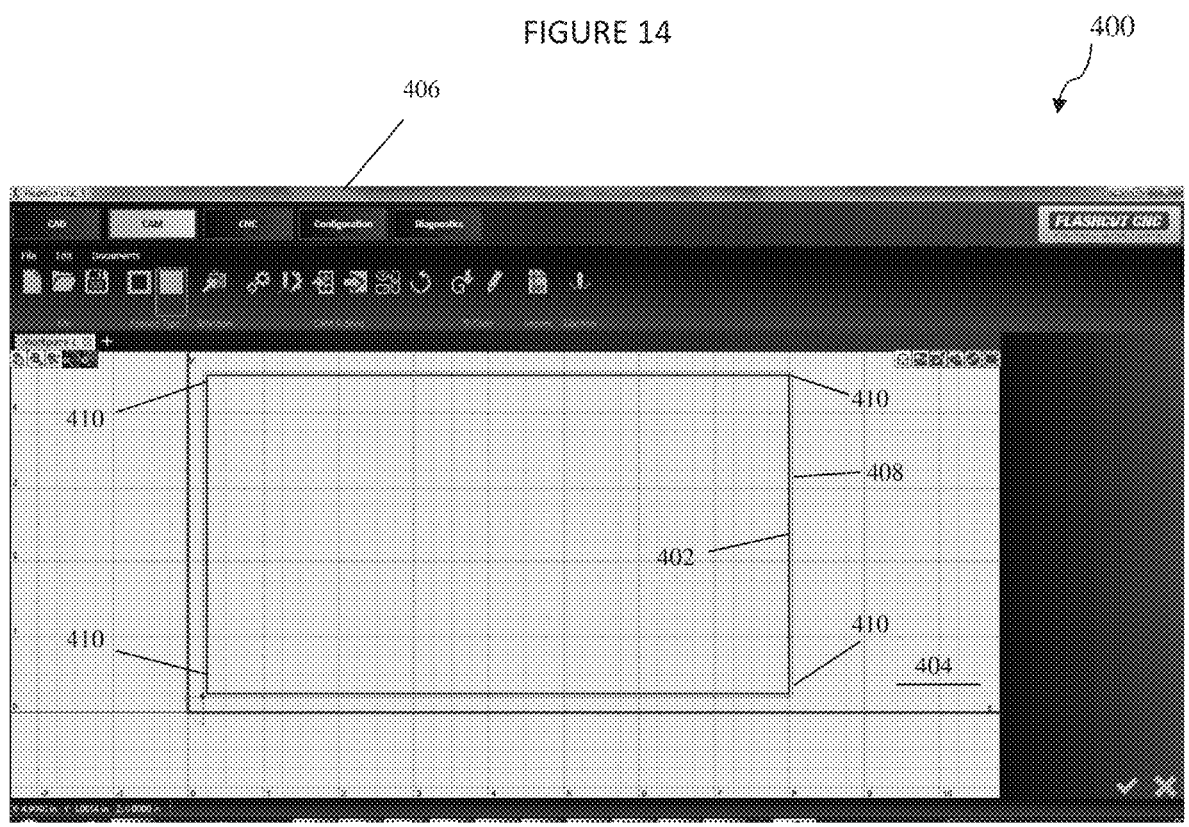
FIG. 15 is a CAD drawing displayed on the monitor of a CAD/CAM/CNC system showing an aspect of the Dynamic Corner Looping in accordance with the present invention.

FIG. 15 shows a screen 404 of a monitor 406 of a CAD/CAM/CNC system displaying a typical rectangular drawing file 402 shown in a black outline (inside rectangle), with the toolpath to cut it shown in red or the outside rectangle 408. The acceleration/deceleration zones where quality of cut degrades are highlighted in blue and are located at or near the corners 410.

Figure 16:
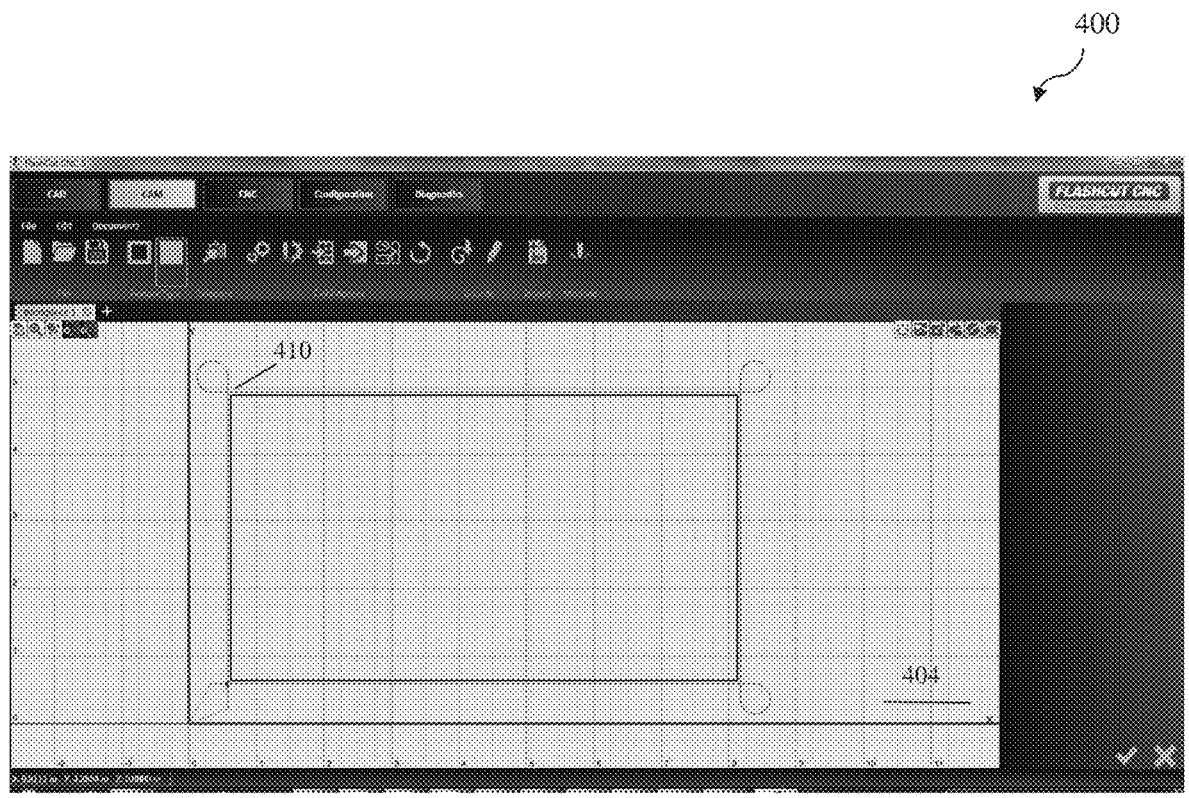
FIG. 16 is a CAD drawing displayed on the monitor of a CAD/CAM/CNC system showing an aspect of the Dynamic Corner Looping in accordance with the present invention.

Although several CAD/CAM programs have implemented "corner looping" to control the acceleration/deceleration zone outside of the actual part (to be cut), to make sharp corners 410 as seen in FIG. 16, the current CAD/CAM systems do not have the ability to obtain the necessary information, i.e., the accelerations of the machines, so any corner looping 412 must use hypothetical information thereby providing conservative turns and increased (and unnecessary) larger loops in order to ensure a full speed cut at each corner 410. These conservative estimates waste time and material outside of the drawing and part 402 that needs to actually be cut.

Figure 17:
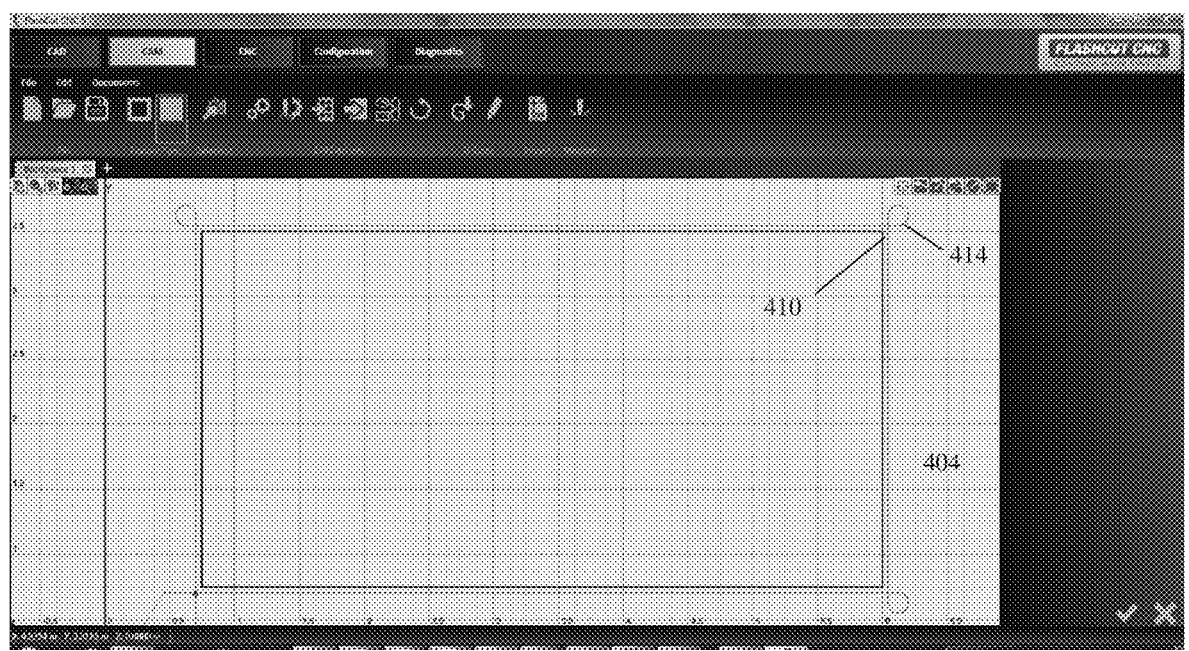
FIG. 17 is a CAD drawing displayed on the monitor of a CAD/CAM/CNC system showing an aspect of the Dynamic Corner Looping in accordance with the present invention.

However, as shown in FIG. 17, the integrated CAD/CAM/CNC system, which includes the Dynamic Corner Looping system 400 of the present disclosure, is able to obtain all of the information necessary, based on full knowledge of the dynamics of the entire system, to more accurately and precisely calculate the minimal length of each loop 414. This functionality can be used to minimize the size of the corner loop 414, thus maximizing/minimizing the amount of material usage while maintaining good cut quality.

Figure 18:
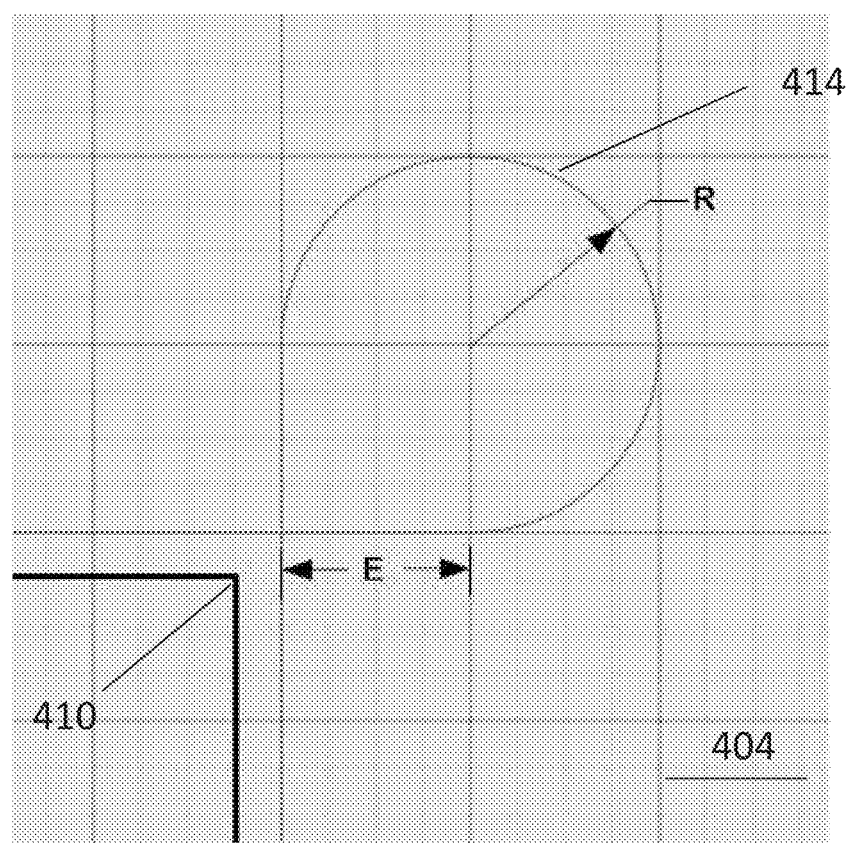
FIG. 18 is a CAD drawing displayed on the monitor of a CAD/CAM/CNC system showing an aspect of the Dynamic Corner Looping in accordance with the present invention.

To calculate the minimal rounded loop 414 for a corner with an interior angle Θ (theta), the Dynamic Corner Looping system 400 calculates the minimum linear extension length (labeled E in FIG. 18) that allows the machine to decelerate to the feedrate for the arc motion, such that the arc motion has the smallest possible radius (labeled R in FIG. 18) based on the machine acceleration limits, which minimizes the amount of material usage while maintaining good cut quality.

For all of the calculations, it is assumed that the linear extensions are aligned with one of the machine axes. This is the case that puts the largest burden on a single machine axis, so all rotational orientations of the loop in the cutting plane will be covered for the given machine acceleration limits. First, the duration of the extension move is calculated:

The time for the extension move is the smaller positive root of the quadratic equation:

$$At^2+Bt+C, \text{ where}$$

t=time for extension move
theta=interior angle of corner
Amax=maximum acceleration allowed on machine axes in the cutting plane (use lower of the two axis values)
Fcut=cutting feedrate $$A=(1+(\tan(theta/2)/2)*Amax^2$$

$$B=-(2+\tan(theta/2)*Fcut*Amax$$

$$C=Fcut^2$$

Next, the arc motion federate is calculated:

$$Farc=Fcut-Amax*t$$

The linear extension length is then calculated:

$$E=(Fcut^2-Farc^2)/(2*Amax)$$

And then the arc motion radius is calculated:

$$R=Farc^2/Amax.$$

Figure 19:
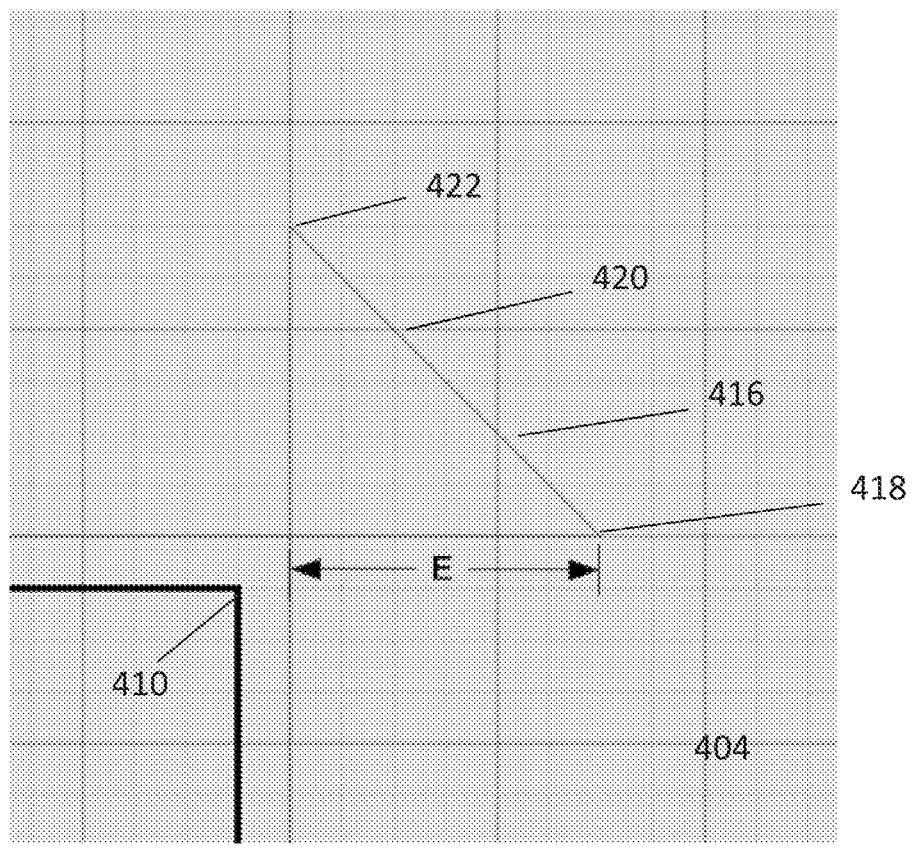
FIG. 19 is a CAD drawing displayed on the monitor of a CAD/CAM/CNC system showing an aspect of the Dynamic Corner Looping in accordance with the present invention.

The Dynamic Corner Looping system 400 can also create "fish-tail corners" where triangles 416 are used at each corner 410 instead of loops 414. The Dynamic Corner Looping system 400 calculates the first linear extension length (labeled 'E' in FIG. 19) such that the machine can decelerate from the cutting feedrate to the start-stop feedrate by the end of the move 418. The system then generates a diagonal move 420 to the beginning of the second extension 422. Finally the system generates a second extension line equal in length to the first extension line, the length being exactly the distance required for the machine to accelerate from the start-stop feedrate to the cutting feedrate by the time it reaches the corner 410. By minimizing the extension lengths, the system minimizes the amount of material usage while maintaining good cut quality.

To calculate the linear extension length E, the following equation is used:

$$E=(Fcut^2-Fss^2)/(2*Amax)$$

where
Fss=feedrate at or below which machine axes in the cutting plane can start or stop instantaneously (use lower of the two axis values)
Amax=maximum acceleration allowed on machine axes in the cutting plane (use lower of the two axis values)
Fcut=cutting federate.

For cutting applications that require the same cutting feedrate to be used for the entire corner loop 424, the Dynamic Corner Looping system 400 optionally adds two arc motions that are tangent to 1) the original toolpath (at the corner), R1; and 2) the loop, R2. The Dynamic Corner Looping system 400 calculates the minimum possible radius used for all arcs (labeled R1 and R2 in FIG. 20), based on the acceleration limits of the machine axes, resulting in a loop 424 that is located as close to the corner as possible, which minimizes the amount of material usage while maintaining good cut quality. In the preferred embodiment, R1 equals R2. As the interior corner angle gets closer to zero, the advantage of positioning the corner loop using this technique, and the resulting material savings, get larger.

To calculate the radius R1 and R2, the following equation is used:

$$R=Fcut^2/Amax$$

where
Amax=maximum acceleration allowed on machine axes in the cutting plane (use lower of the two axis values)
Fcut=cutting federate.

Additionally, wireless pendants are becoming more popular in machine control, especially for machines controlled by a personal computer or PC motion control application. These wireless devices use Wi-Fi or some other wireless communication protocol to connect to the controlling PC, although other types of wireless communications are known to those having ordinary skill in the art. However if someone is using their mobile device or cellular phone as the wireless device, it may be easy to walk away from the PC (and the CNC machine) with the pendant and maintain control while in range of the Wi-Fi even when you are out of sight of the CNC machine. This can cause a dangerous situation in which a CNC machine, such as a milling machine, is running through the steps, and being controlled without proper visual supervision.

For example, assuming that the pendant application uses a touch screen to control the machine, an operator may inadvertently control the machine while the pendant is in their pocket (or if the device gets moisture on it). As such, an added safety measure provides the pendant application to require that the user or operator simultaneously press a physical button such as the volume up or down buttons on a smart phone, in order for a touch screen command for machine control to be validated and sent to the PC to process the machine.

To obviate this disadvantage, a wireless technology can be implemented that has a small or adjustable range, such as a Bluetooth "tethering" device to indicate to the application that the operator is in necessary or visible range. Other devices and connection protocols are available and can be substituted herein. In the preferred embodiment, a Bluetooth beacon is used. If the device is in the proper range, it can control the machine, if it is not in proper range, then the algorithm will prohibit the wireless pendant from controlling the machine. The range can be expanded or contracted by changing the transmit power of the Bluetooth device. However, when out of tethered range, the application will still be able to communicate to the PC via Wi-Fi to display useful information, such as machine position, input and output line status and a progress meter for a program or manufacturing process running on the machine.

Another aspect of the invention is to have the PC application generate a QR code of the IP address on the PC screen that you are connecting the wireless pendant to and then have the remote pendant optically scan the QR code for the IP address. This will enable the pairing of the device to the PC without the user having to find the IP address of the PC on the Wi-Fi network and having to type this IP address into the remote pendant.

Figure 21:
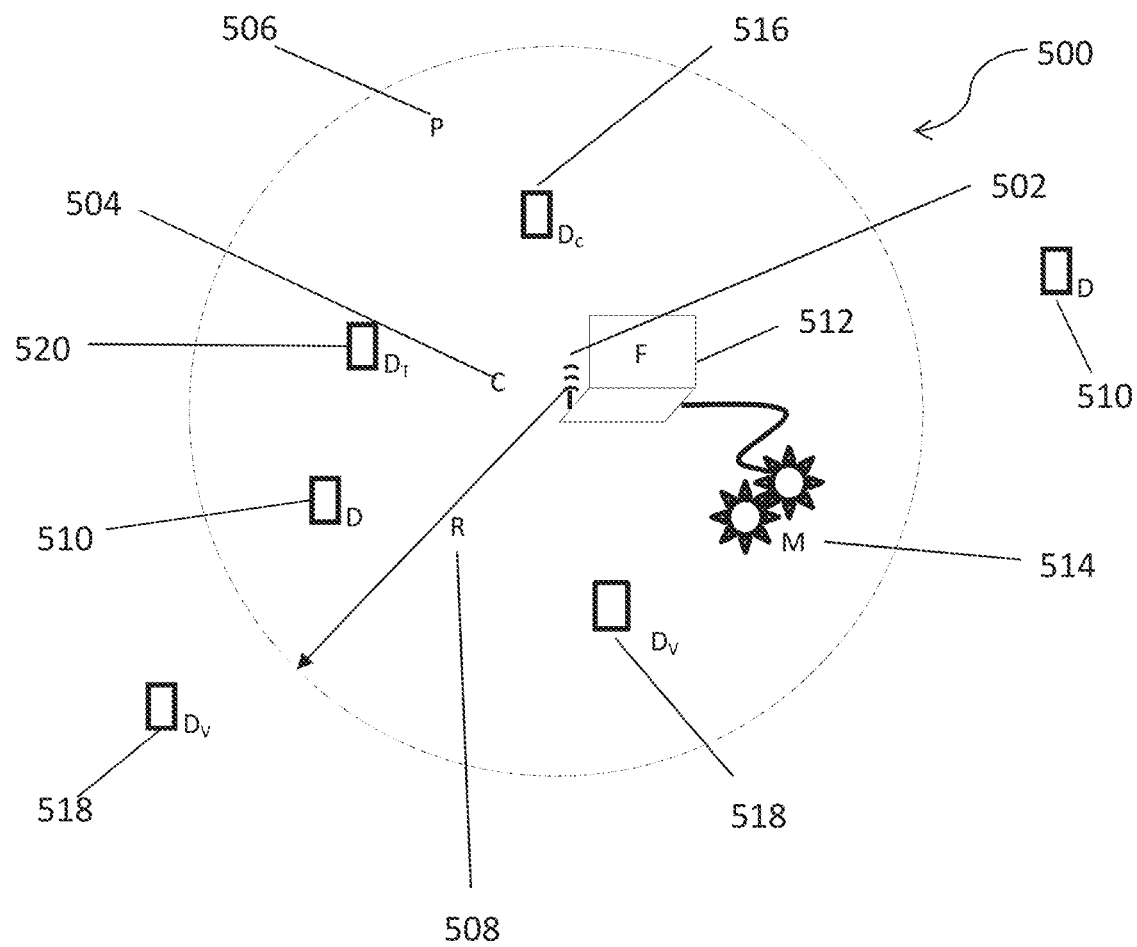
FIG. 21 is a drawing showing an aspect of the pendant tethering system in accordance with the present invention.

FIG. 21 shows an exemplary diagram of the remote pendant system 500 in accordance with the present invention in which a beacon is used to located various remote devices. The beacon uses Bluetooth low energy proximity sensing, or BLE to transmit a universally unique identifier, which can be picked up by an application or by an operating system. The identifier and several bytes sent with it can be used to determine the device's physical location, track users, or trigger a location-based action.

In the present invention, the transmit point of a beacon 502 is located at the center 504 of the proximity region 506 with radius R 508. The proximity region 506 is where the beacon 502 is visible to remote devices D 510.

The computer running the application or software F 512 either contains its own BLE device or comprises one or more USB ports or other communication connectors where the BLE beacon 502 is connected. A machine M 514, such as a milling machine, plasma cutter or laser marker, among others, can be connected to and controlled by the computer running the software 512. The one or more remote devices 510 can be connected to the software 512. Although the preferred embodiment herein uses both a Bluetooth beacon along with Wi-Fi to accomplish the functionality, the system could also use Bluetooth, or other communication protocols for both functions.

In this example, device $D_C$ 516 is a device that has found and connected to the application or software 512. The device $D_V$ 518 is a device in view only mode, and device $D_T$ 520 is a device that is tethered to the system 500 and therefore can control it. Further, all devices start out as D devices 510. Outside of the P region 506, only D 510, $D_C$ 516 and $D_V$ 518 devices exist. A D device 510 can become a $D_C$ 516 or a $D_V$ 518 device, either inside or outside the P region 506. Moreover, there can only be one $D_T$ 520 device in the P region 506. A $D_V$ 518 device can become the $D_T$ 520 device only in the P region 506. D 510 or $D_C$ 516 devices can never become the $D_T$ 520 device. The $D_T$ 520 device can become a $D_V$ 518 device and a $D_V$ 518 device can become a $D_C$ 516 or D 510 device. If the $D_T$ 520 device moves outside of the P region 506, it becomes a $D_V$ 518 device automatically. If a $D_V$ 518 device loses its Wi-Fi connection it becomes a D 510 device.

Figure 22:
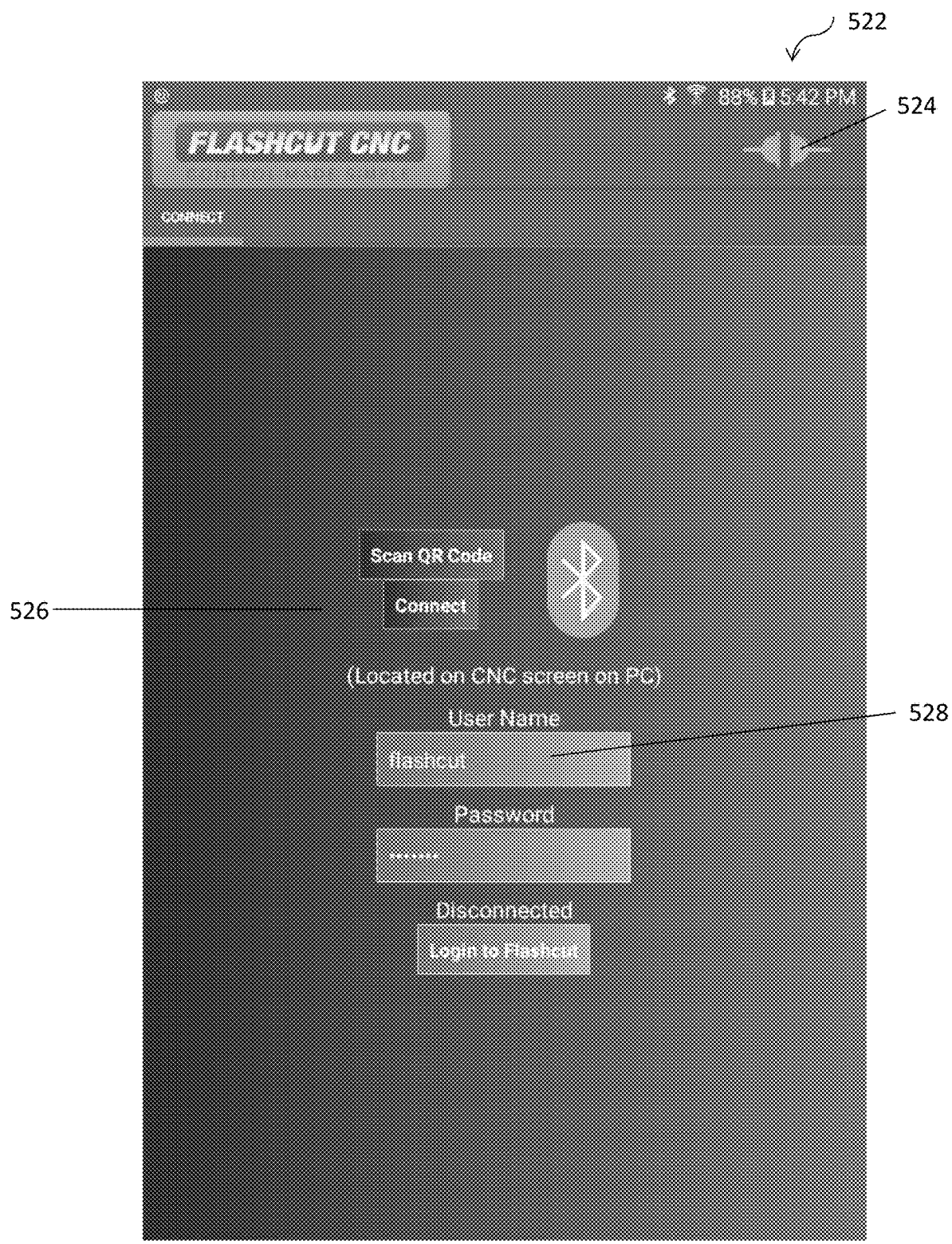
FIG. 22 is a drawing showing an aspect of the pendant tethering system in accordance with the present invention.

In a preferred embodiment, when the user launches the application 512 for the first time, the connect screen 522 (FIG. 22) will be displayed, showing, inter alia, that the connectors 524 in the upper right corner are gray and separated. At this time, the connect button 526 is available and the login elements 528 are disabled.

There are two phases to establish a successful connection with the application. In the first phase, the user selects the connect button 526 on the connect screen 522 and the application 512 uses the wireless pendant 502 to search for connections. If connections are located the application 512 displays the particular computer located in which the system 500 is resident. If no connections are located, the user is notified.

Figure 23:
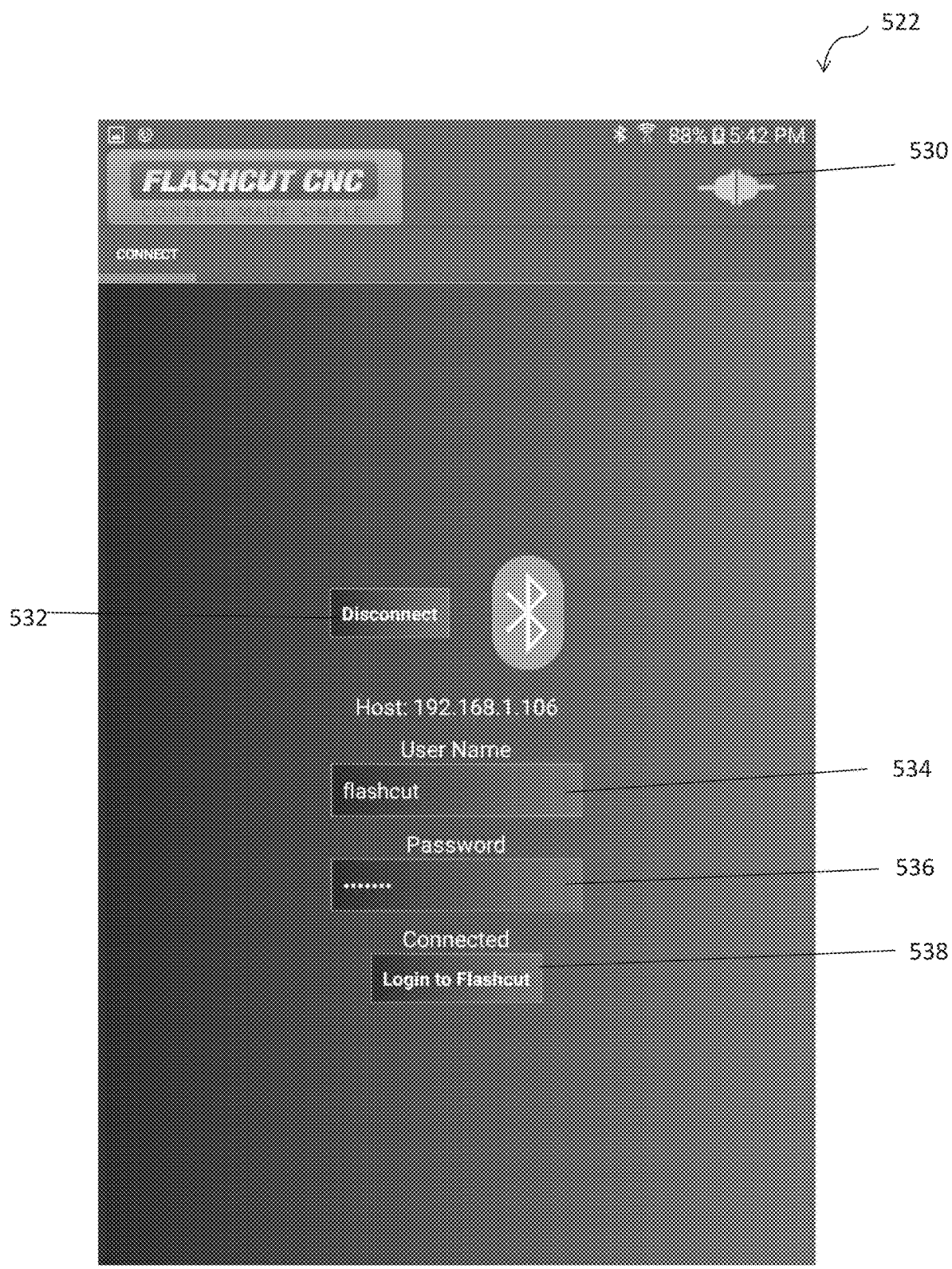
FIG. 23 is a drawing showing an aspect of the pendant tethering system in accordance with the present invention.

In the second phase, the user is presented with and selects a connection, once the computer with the system 500 is displayed. FIG. 23 shows the connect screen display 522 with a successful connection 530 joining the gray connectors in the upper right corner, and the ability to disconnect 532, if and when necessary.

Figure 20:
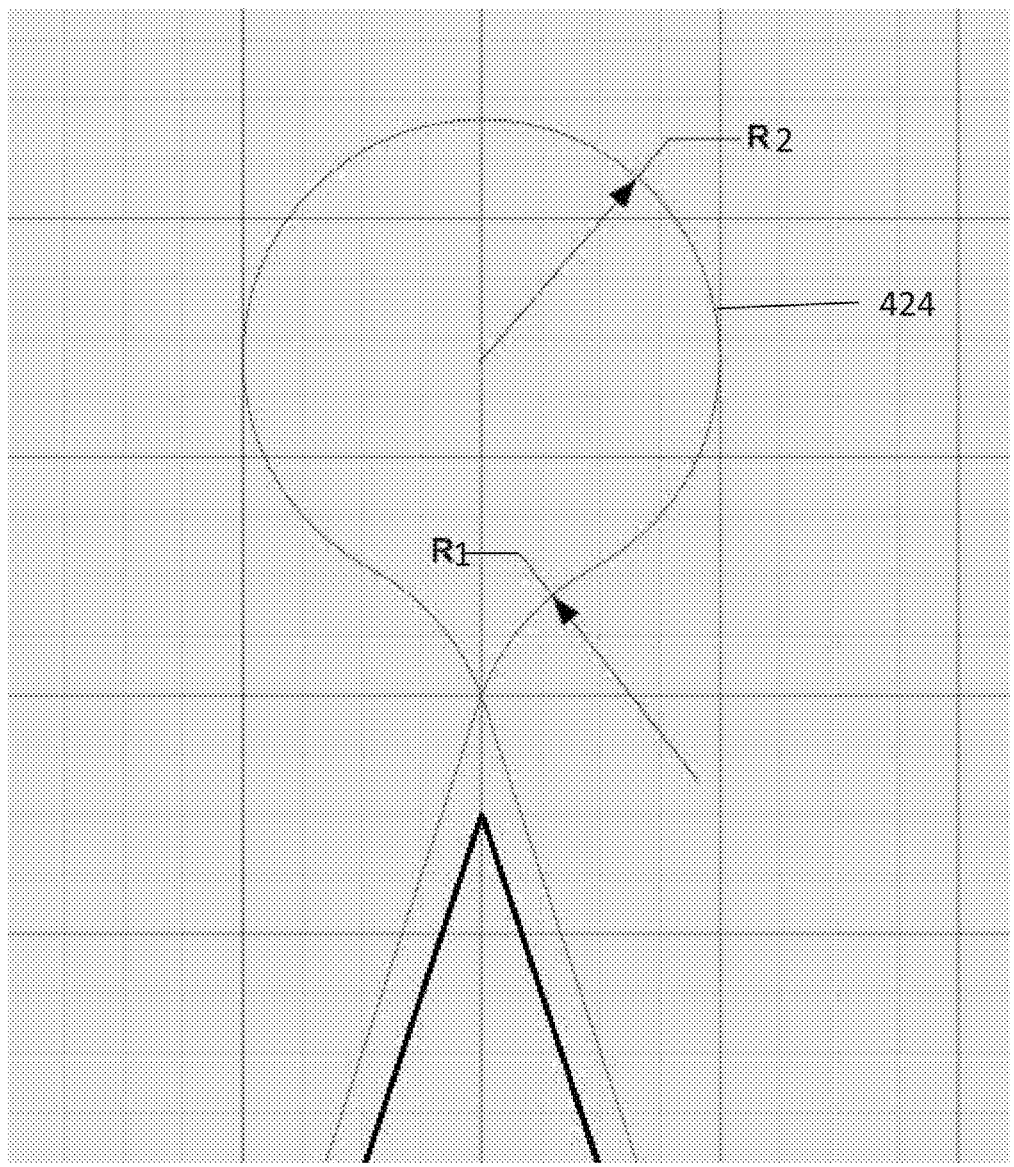
FIG. 20 is a CAD drawing displayed on the monitor of a CAD/CAM/CNC system showing an aspect of the Dynamic Corner Looping in accordance with the present invention.

The next step is to successfully authenticate with the system 500. Authentication is accomplished by entering the correct login credentials in the proper user name 534 and password 536 fields, and selecting the Login to Flashcut button 538. A successful authentication process changes the color of the joined connectors 530 to blue, or some other indication that the authentication has occurred. At this point, the user is able to navigate to the G-Code and inputs panels and view real-time data from the system 500 and the machine 514 (FIG. 20).

Next, in order to gain control of the machine 514, the wireless pendant 502 will need to Link with the application 512. As a safety precaution, this step requires that the wireless pendant be within tethering distance of the machine and that the user acknowledges a disclaimer dialog at the computer. This disclaimer could be located at the top of the display 522 or in some other location that the user would have to view before gaining control of the machine 514. The screen 522 on the application 512 would inform the user of steps that needs to occur at system 500.

If the user agrees to the disclaimer, the wireless pendant will now be on a Linked State (tethered) with the system and the user will have full control of the machine 514. The joined connectors 530 on the upper right corner will turn green (or some other indication).

Figure 24:
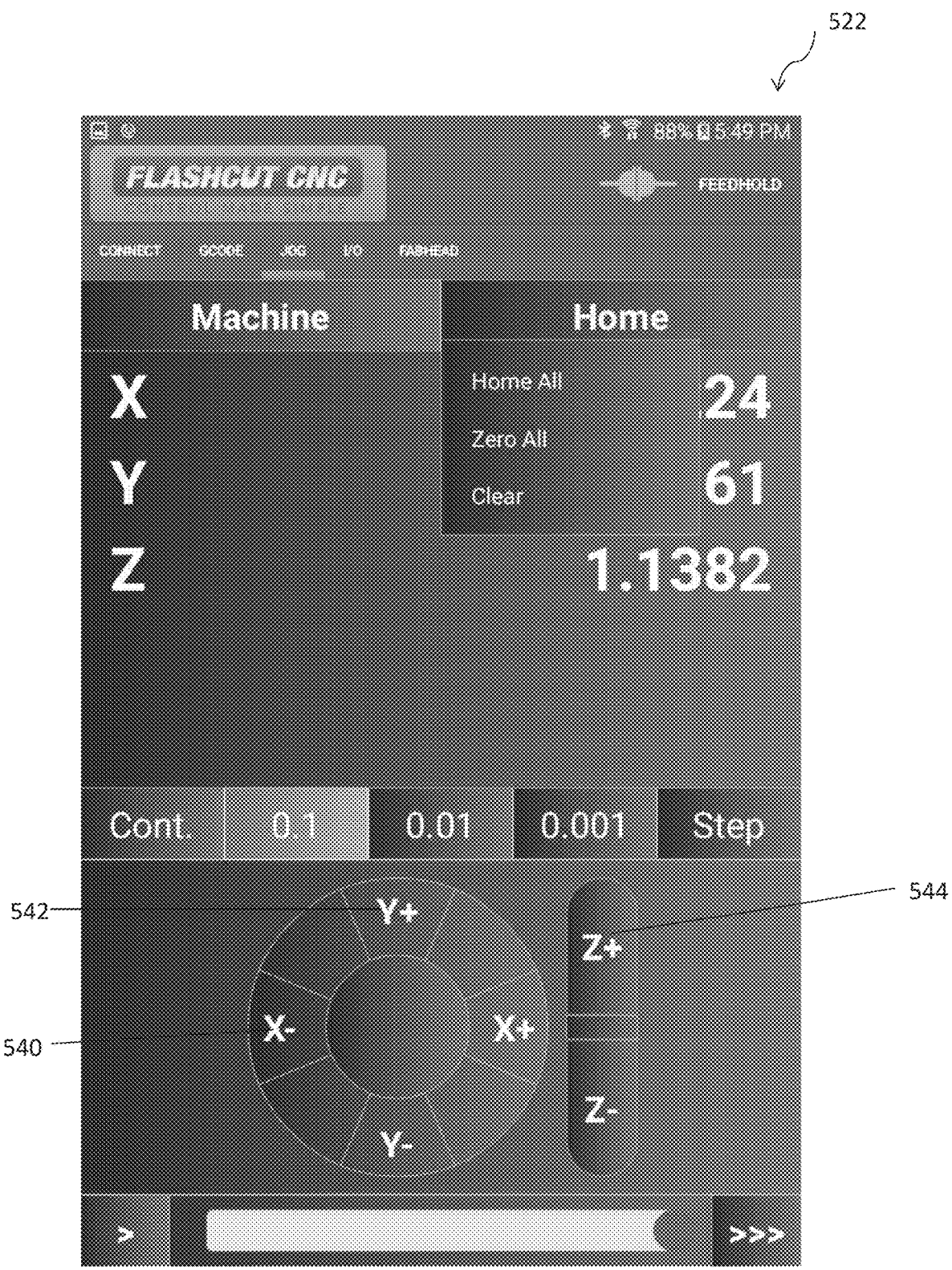
FIG. 24 is a drawing showing an aspect of the pendant tethering system in accordance with the present invention.
Figure 25:
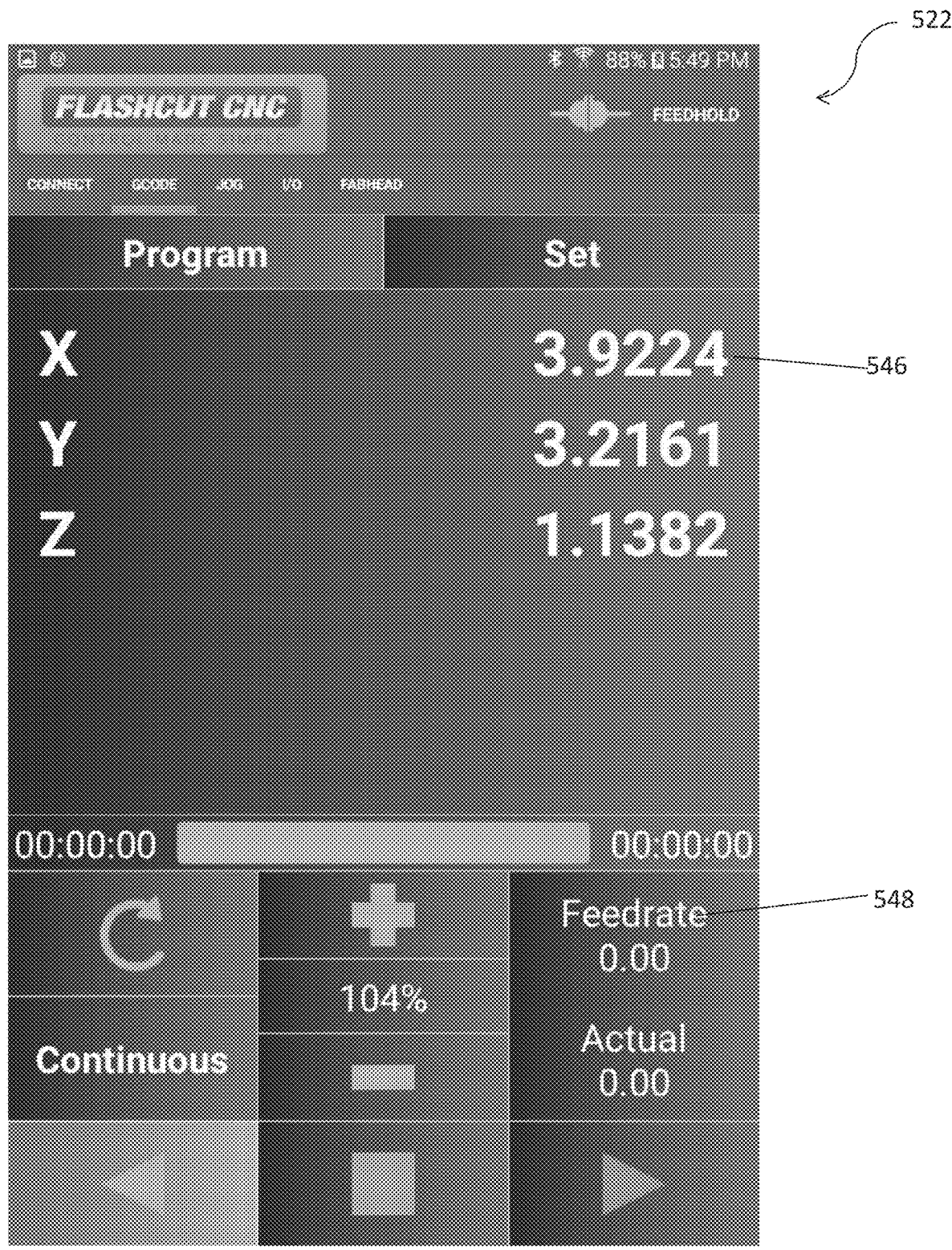
FIG. 25 is a drawing showing an aspect of the pendant tethering system in accordance with the present invention.

FIGS. 24 and 25 are example displays on a linked device 520 showing actual real-time data for the machine 514, including controls for the X-axis 540, Y-axis 542 and Z-axis 544 (FIG. 24) and G-Codes 546 and Feedrate 548, among others. The G-Code 546 screen also shows the progress of the program running and the position of the screen. This information is always available, even when the pendant is out of range of the device, or $D_v$ 518. The commands are the same commands as if the user was positioned at the computer running the software 512.

If the linked device 520 goes out of tethering range, then the system 500 can automatically detect this condition and take appropriate safety measures such as stopping the machine 514 automatically. Additionally, the device 520 will no longer be linked to control the machine 514, but it will remain connected to be able to read machine status. If the device 520 then goes back into tethering range 506, then it will need to go through the linking process again to control the machine.

Additionally, the user can scan a QR code from the PC and the Bluetooth pairing to the PC for tethering.

The G-Code screen where the pendant can remotely start and hold the program running on the machine this functionality is only active when in range of the Bluetooth device.

As examples of some of the safety precautions, spindle speed control of the milling machine 514, turning on or off a torch in a plasma table, or a laser, or any feature of any fabrication head properly configured and connected to the system, is only available when the device is in Bluetooth range 506 and the device is tethered. The Jog Control allows the user to manually move the machine, for example by pressing the jog buttons on the screen and physically holding down the volume button on the side of the pendant. This functionality is also only available when the device in in Bluetooth range 506 and the device is tethered. Other similar functionality can be incorporated using these or other buttons, and/or proximity sensors, often located in wireless devices with a touch screen.

Digital Output control allows the user to turn on and off different output lines on the machine 514. This functionality is only available when the device is in Bluetooth range 506, however, someone can view the status of the outputs when out of range of the Bluetooth 506, but still in range of the Wi-Fi. Also, the Digital Input screen shows the status of the inputs independent of being in range 506 and the device is tethered of the Bluetooth. Additionally, for safety precautions, the Bluetooth beacon 502 should be electrically connected to the system 500, otherwise, if the Bluetooth beacon 502 is battery operated, the user can inadvertently move the beacon 502 and change the proximity region 506. The system 500 continuously verifies that the beacon 502 is electrically connected to the system 500 and not on battery power.

Another feature of the present invention is a recording system or a THC Flight Data Recorder FDR 600. The FDR 600 is a feature that allows a CNC system, such as a system that controls a milling, plasma, waterjet, or laser machine, to collect and display data from an analog feedback control system for analysis, verification, and technical support purposes.

As an example, in plasma cutting, a Torch Height Control system 42 as described herein is used to maintain a precise distance between the plasma torch 12 and material being cut in order to produce accurate cuts while minimizing manual post processing and improving torch consumable life. When problems with the system 42 occur, in order to determine and solve the problems or errors, one may have to make multiple iterative cuts to replicate the problem, which results in wasted operator time, machine time, and material waste.

The ability to automatically collect data for a cut sequence, while it occurs, allows an operator or technician to observe the information for that sequence in real-time for diagnosis and evaluation of system operation. The collected data is saved to a file for more complete analysis and review at a later date.

Among the data collected is the THC status, the Arc Voltage, which includes the target and measured voltages, and the position information. Other data can be collected, depending on the needs of the system.

Figure 26:
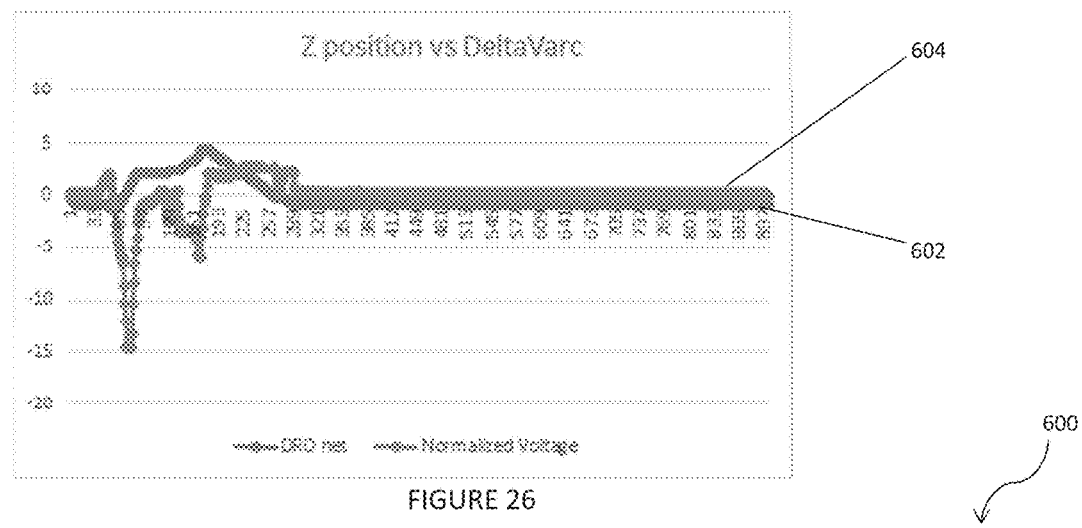
FIG. 26 is a drawing showing an aspect of the recording system in accordance with the present invention.

The information collected can be used to generate charts to graphically demonstrate, for example, the z-axis motion against the variation in arc voltage. FIG. 26 shows such a graph in which the Z position 602 is plotted against the normalized change in arc voltage 604, over time (x-axis). Of course, there are many graphs that can be created based on the variables and there are different types of configurations for displaying the information, such as graphs, charts, etc.

Although the example is for a plasma cutting system 42, the data collection system could be used with any analog feedback control system, such as waterjet cutting, laser cutting, etc. Any system that is capable of providing an appropriate feedback, such as a voltage to adjust cut height.

Figure 27:
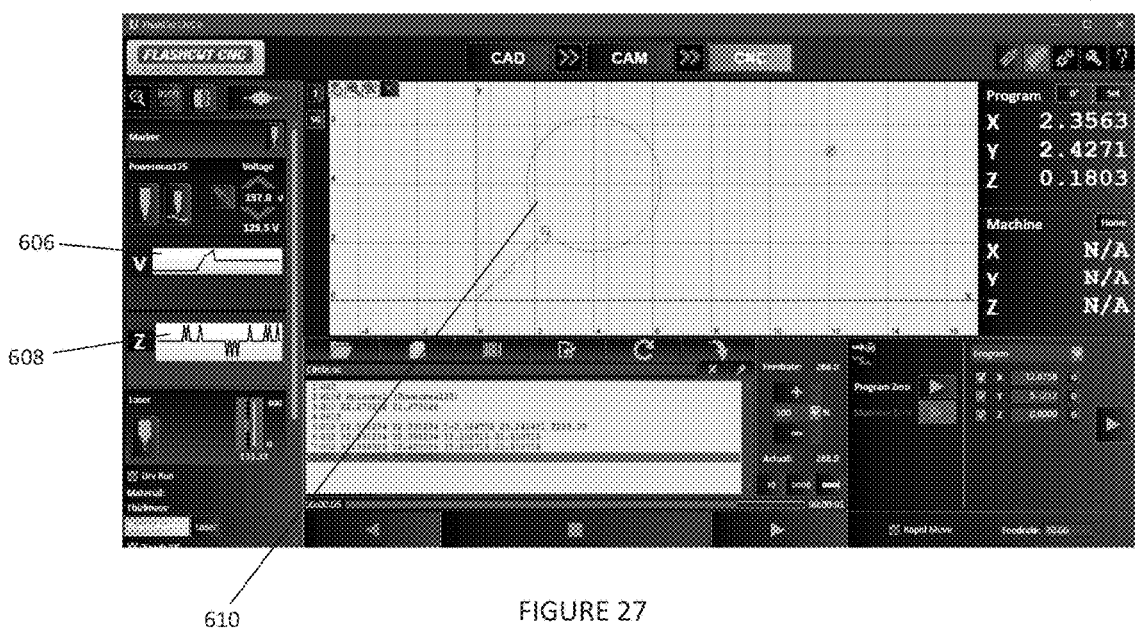
FIG. 27 is a drawing showing an aspect of the recording system in accordance with the present invention.

FIG. 27 is an example of a real-time display of the collected data on the CNC user interface. It shows a trace of the plasma voltage 606 and the Z motion 608 on the same time axes over a running period of time. Other variables can be added such as the toolpath 610, and the status of torch height control being on or off.

Figure 28:
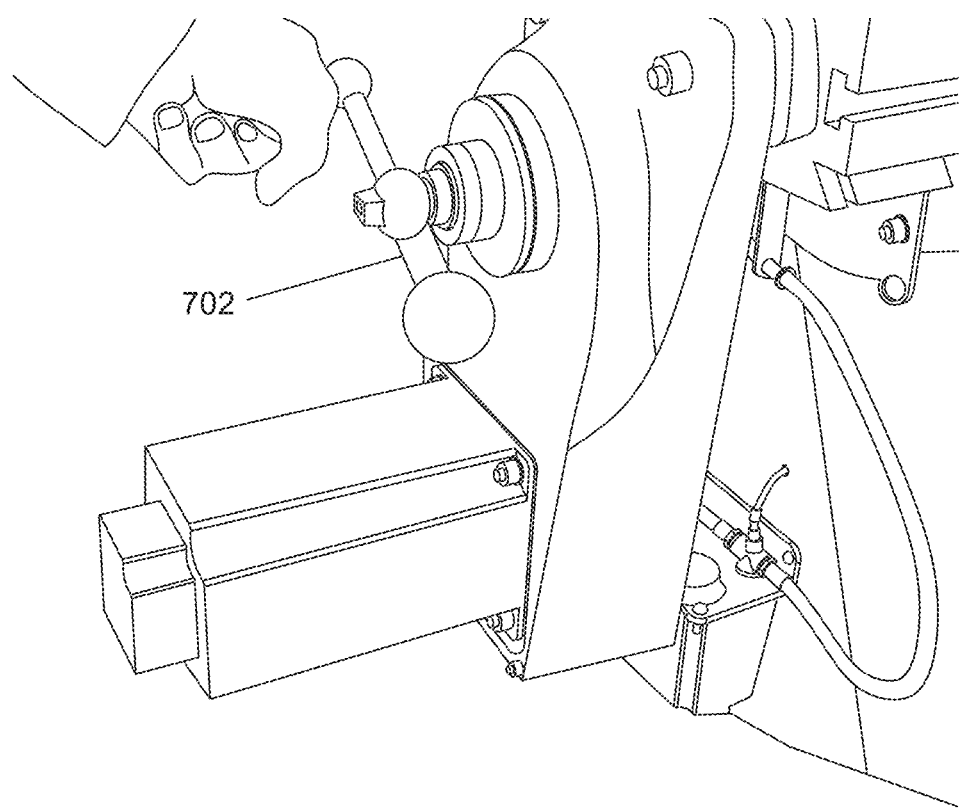
FIG. 28 is a drawing showing an aspect of the manual hand wheel simulation in accordance with the present invention.

Another feature of the present invention is a manual hand wheel simulation system 700. Many times a machinist of a CNC machine will want to run the machine manually using hand cranks 702 in addition to running the machine automatically using CNC controlled motors as shown in FIG. 28.

Figure 29:
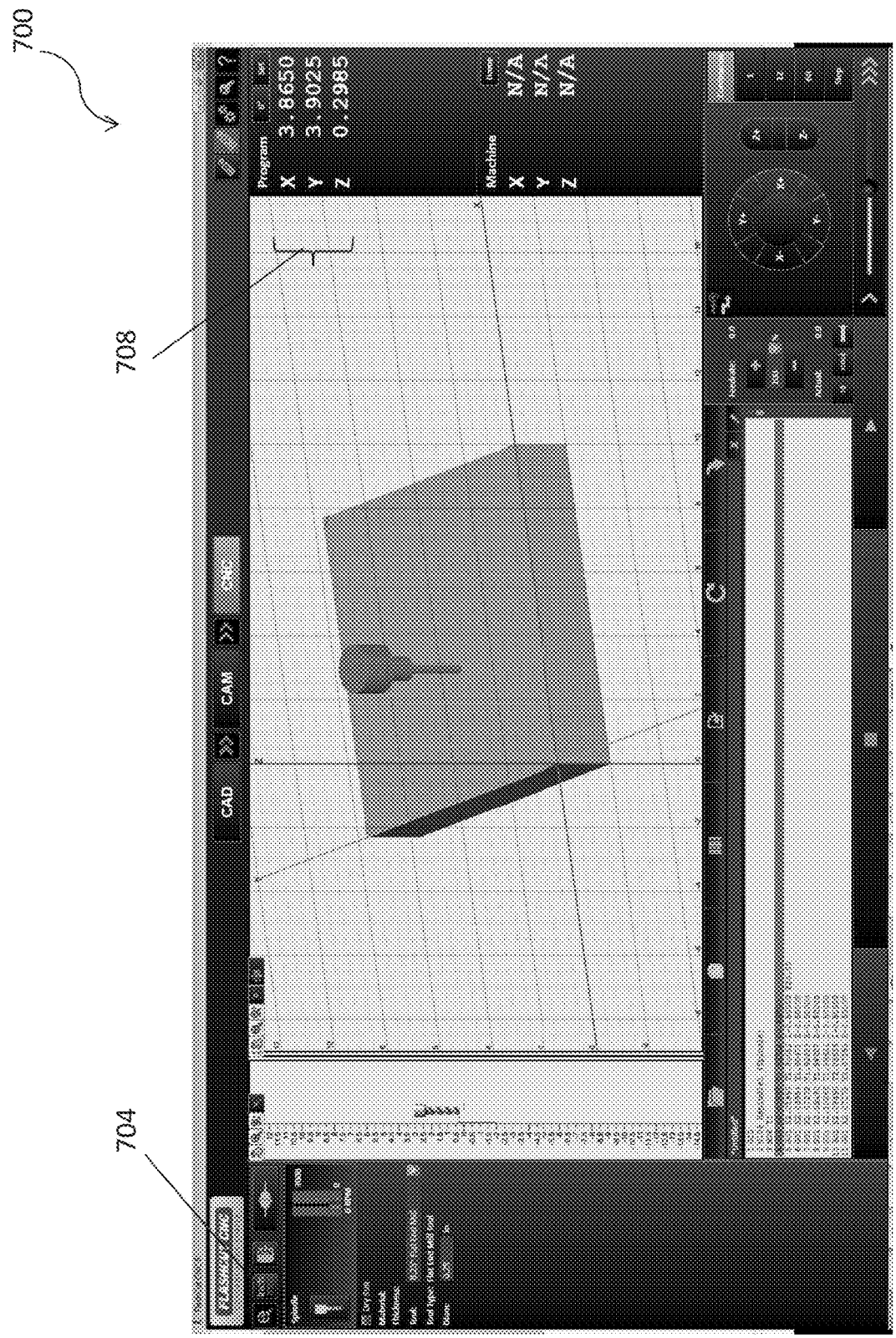
FIG. 29 is a drawing showing an aspect of the manual hand wheel simulation in accordance with the present invention.
Figure 30:
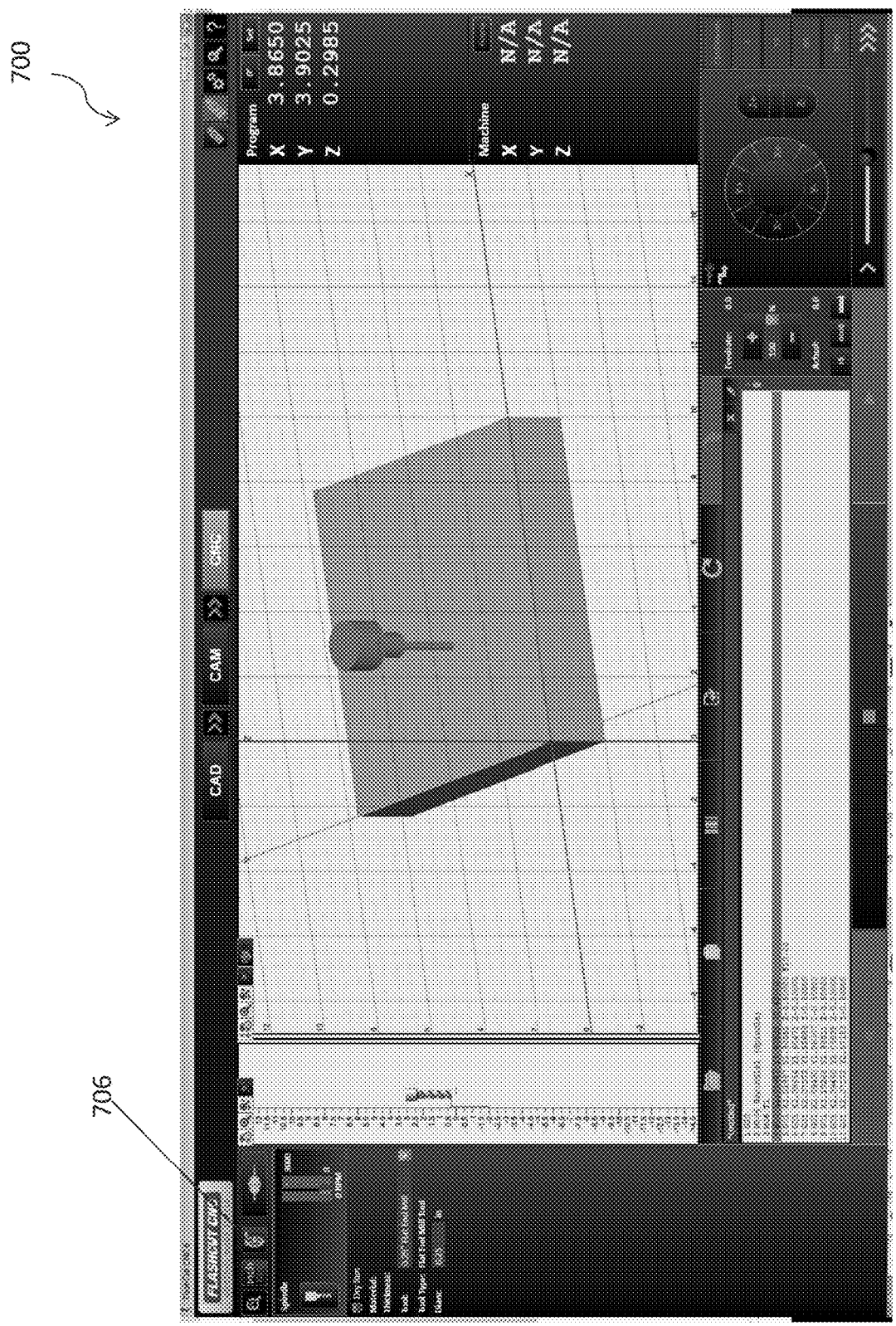
FIG. 30 is a drawing showing an aspect of the manual hand wheel simulation in accordance with the present invention.

FIG. 29 shows the CNC control screen of a manual hand wheel simulation system 700 in the motor control mode, as depicted by the motor icon 704 in the upper left corner. FIG. 30 shows the CNC control screen 700 in manual mode, as depicted by the hand crank icon 706 in the upper left corner. It is very useful for the user to be able to have consistent digital readings of the X, Y and Z positions 708 whether the machine is in CNC mode 704 or manual positioning mode 706. This consistency is maintained by having a mechanical system in which the hand crank 702 is rotationally connected to the motor shaft (not shown), either directly or through belts, pulleys or gears. Then the computer system can continuously check the encoder position of the motor regardless of the motor being energized or not.

Additionally, there are times when the position shown in the digital readouts is not coming directly from the motor or linear encoder, but instead the digital readouts show the calculated position that the machine was commanded to go to using an interface such as step and direction. In this case, when the user changes between automatic and manual mode the digital readouts need to switch between accounting for steps in either direction and encoder pulses in either direction, and they must be consistent with each other.

Figure 31:
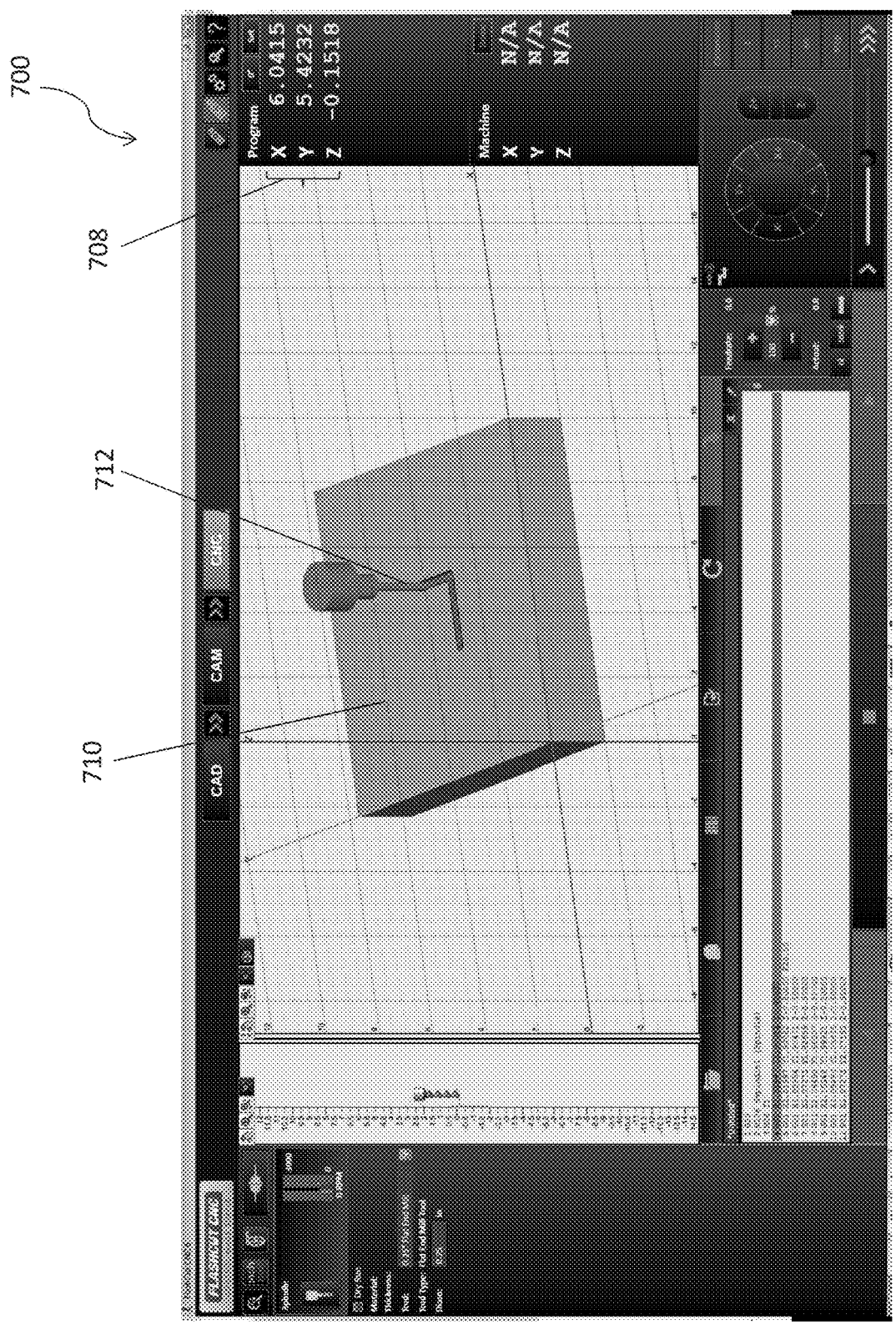
FIG. 31 is a drawing showing an aspect of the manual hand wheel simulation in accordance with the present invention.

This position information can not only update the digital read outs 708, but it can be used to simulate cutting through a virtual block of material 710 using 3D CAD simulation of the material and a tool 712 in the machine as shown in FIG. 31. This is extremely useful in training people how to manually machine a part on a machine, and it provides a process for practicing cutting on the actual machine, without actually cutting a part and possibly wasting material.

Another feature of the present invention is a fabrication head management system 800. Often, there is the need to represent devices that are used to fabricate parts from material. Many CNC systems support many types of fabrication, such as laser cutting, milling, waterjet cutting or plasma cutting. The devices that perform these fabrication operations are called "fabrication heads" or "fab heads."

The fabrication head management system application 800 can be configured to manage one or more fabrication heads. If more than one fabrication head is configured, the heads can be different types. Fab heads can be designated as marking or cutting devices; cutting devices cut through the material, while marking devices engrave or etch the material. This information is used primarily by the CAD module of the software.

Figure 32:
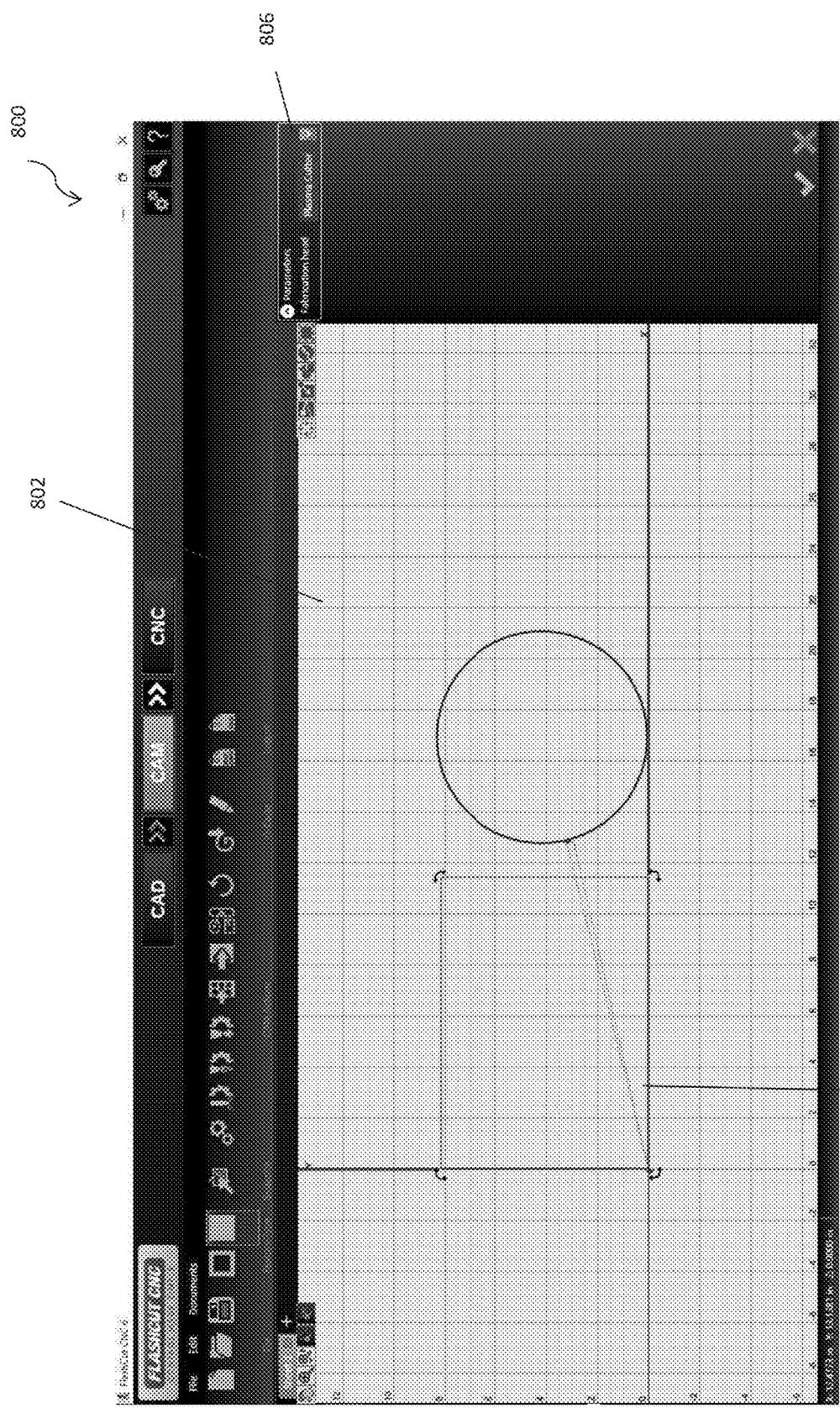
FIG. 32 is a drawing showing an aspect of the fabrication head management system in accordance with the present invention.

When using the CAD module, the user of the fabrication head management system 800 can indicate which portions of the drawing are to be marked and which are to be cut. When the drawing is transferred to the CAM module, this information enables the fabrication head management system 800 to select the specific fab head that will perform the operations required to fabricate the designed part. FIG. 32 shows a display 802 of the fabrication head management system application 800. In this example, the user can select a first object 804 (rectangle) and correlate a first fabrication head 806 (plasma) to use to cut the material.

Figure 33:
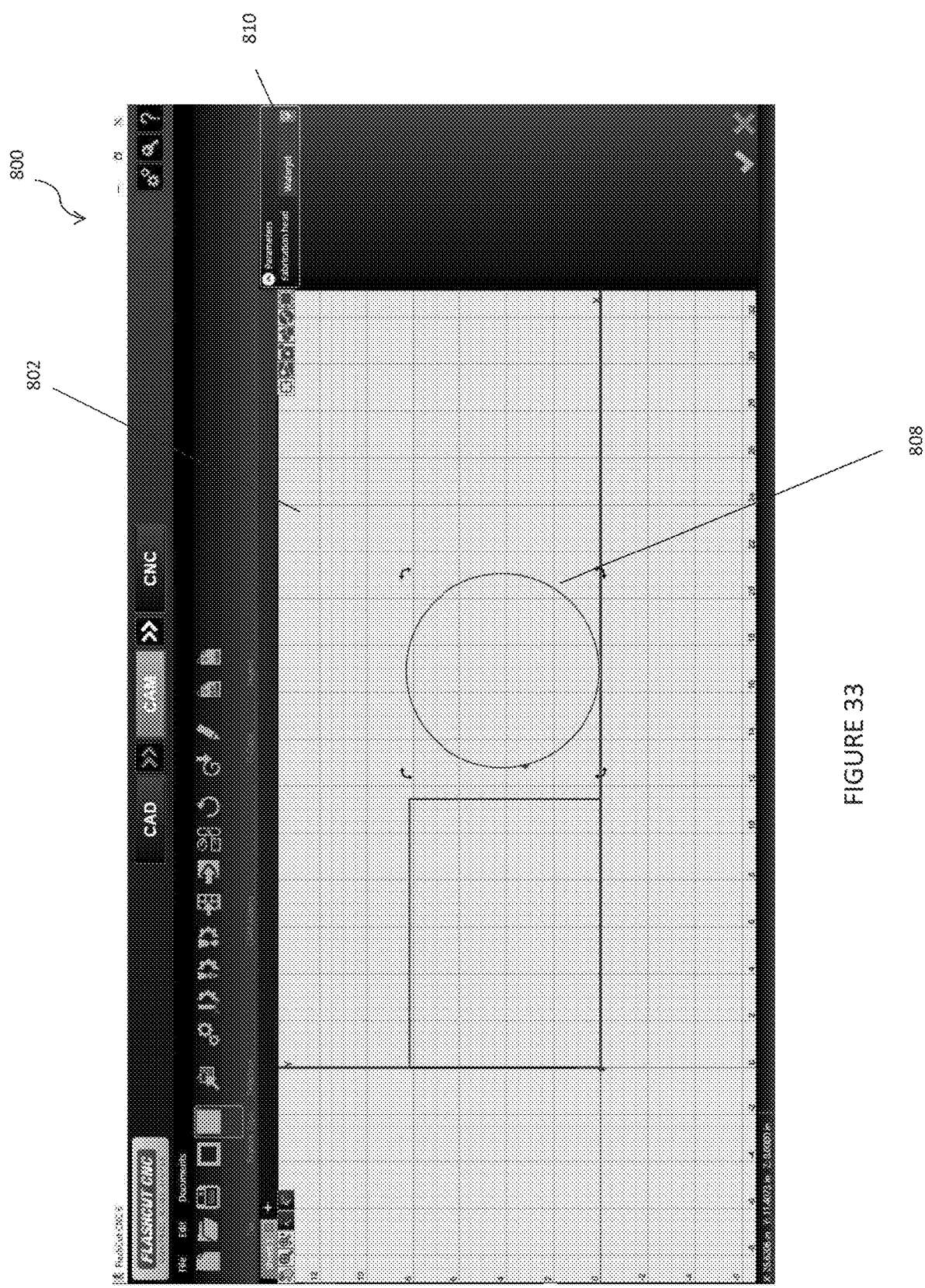
FIG. 33 is a drawing showing an aspect of the fabrication head management system in accordance with the present invention.

FIG. 33 shows a display 802 of the fabrication head management system application 800, in which the user can select a second object 808 (circle) and correlate a second fabrication head 810 (waterjet) to use to cut the material. Additional fabrication heads can be incorporated into the same CAD/CAM project, including other cutting fabrication heads and marker, vibrating or etching fabrication heads, and multiple fabrication heads of the same type, for example, multiple plasma heads or multiple waterjet heads, in the same project.

Figure 34:
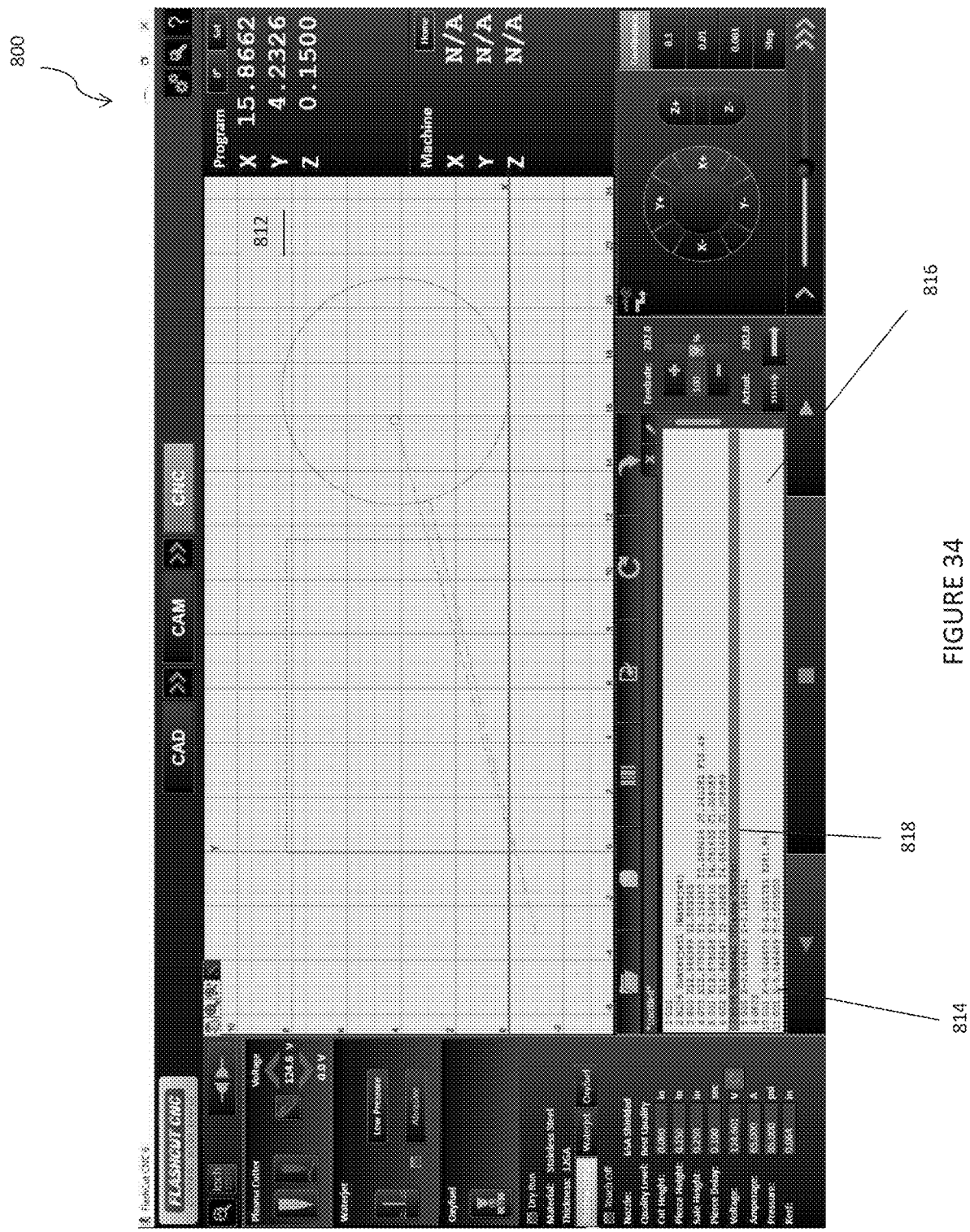
FIG. 34 is a drawing showing an aspect of the fabrication head management system in accordance with the present invention.
Figure 35:
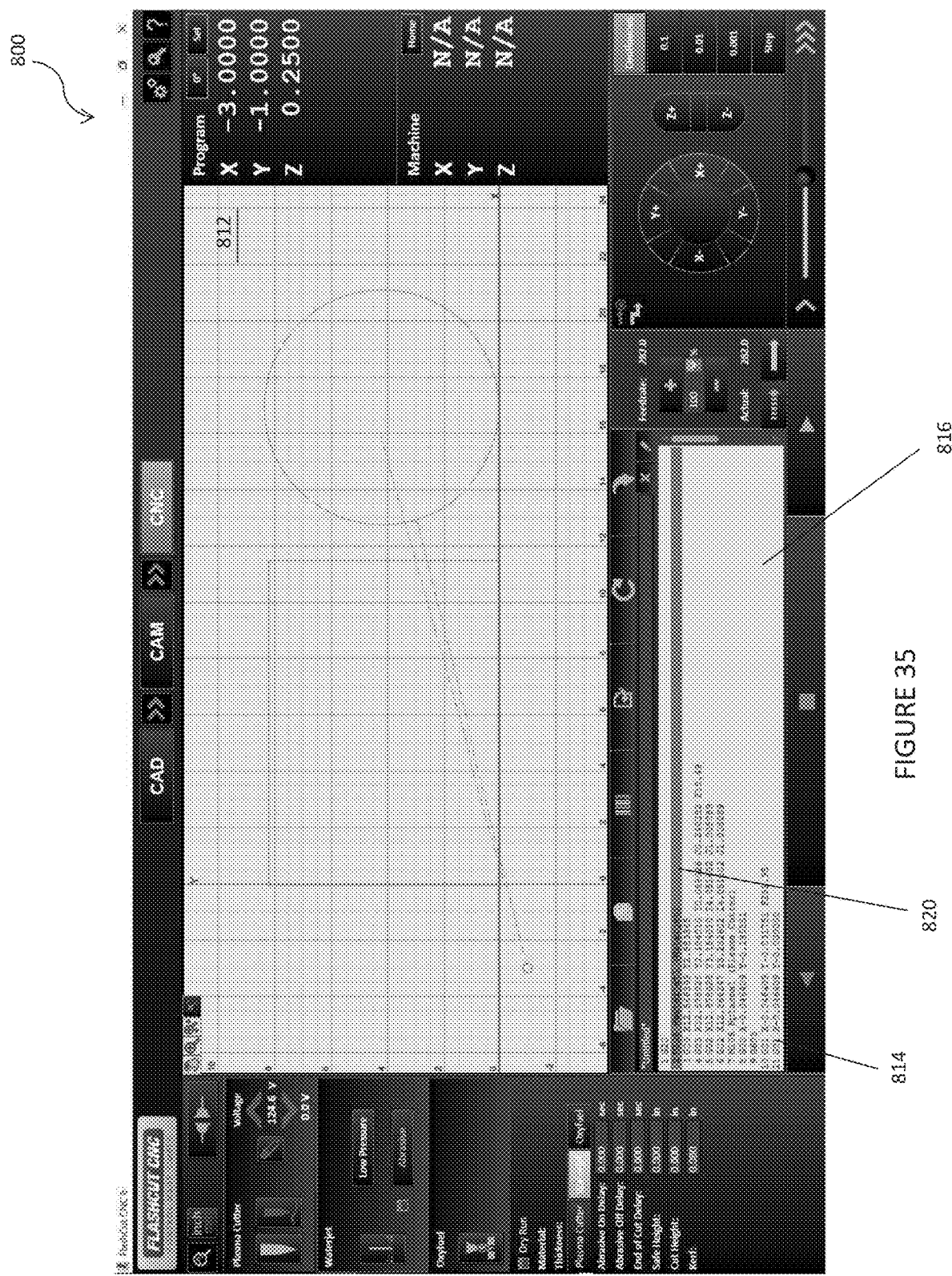
FIG. 35 is a drawing showing an aspect of the fabrication head management system in accordance with the present invention.

The user has the ability to override these selections, and after fab heads are assigned to the CAM operations, the design can be transferred to CNC, at which point a G-code file is created that is used to create the part. FIGS. 34 and 35 show a display 812 of the fabrication head management system application 800, in which as the material is being processed (cut or marked) the G-Codes 814 are displayed in the G-Code Window 816. In this example, the G-Code Window 816 indicates which fab head is being used; plasma fabrication head 818 (FIG. 34) and waterjet fabrication head 820 (FIG. 35). Similarly, if a marker fabrication head was incorporated into the design, the G-Code Window 816 would indicate the marker fabrication head when it was used.

Creation of the part is accomplished by running the CAM-supplied G-code file in the CNC module of the fabrication head management system 800. Specific commands are embedded in the G-code causing the desired fab head to be selected to perform the specified operations. If two or more fab heads are linked together, all fab heads in the link are selected and operated as a group, only differing in their spatial offset. For instance, when one fab head in the group turns on, all in the group turn on.

In the CNC module of the application, all configured fab heads are displayed to the user in the Graphical User Interface (GUI). The user can manipulate each fab head manually by using the controls presented by the GUI to, for instance, turn the fab head on or off. Other, more specific operation can be performed on each fab head as well, depending on the fab head's type.

To support the requirements for fabrication heads, the fabrication head management system 800 includes a class structure that represents a fab head in general, but allows for specialization as needed. A base FabHead class was designed that would represent any fab head in the system. Many of the fab heads used in the fabrication head management system 800 are devices that cut two dimensional parts. Because of the number of these types of devices supported, the fabrication head management system 800 derives a 2-D FabHead class from the parent FabHead class. The specialized fab head classes, such as Laser, Plasma, and Waterjet, all derive from the 2-D FabHead class. Other fab heads, such as Mill and 3-D Printer, derive from the base FabHead class.

Each of the specific fab head types or classes provides the ability to control and monitor the physical device to which it is associated. This includes the capability to turn the device on and off, control power levels, speeds, or other output, and monitor temperature and pressure as applicable to the type of fab head.

From an operational standpoint, turning on a laser is different from turning on a plasma torch, which is different from turning on a mill spindle. However, the fabrication head management system 800 needs the ability to turn on a fab head, regardless of its type, so polymorphism is employed to support the ability to control all basic fab head functions. One common use of this is the ability to turn all fab heads off on feed hold.

Although a number of embodiments of this invention have been described above with a certain degree of particularity, those skilled in the art could make numerous alterations to the disclosed embodiments without departing from the spirit or scope of this invention. For example, all joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. Further, the order of steps is not necessarily limited to the order set forth in the preferred embodiment or in any alternative embodiment.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for cutting a piece of material using a CNC machine coupled to a CAD/CAM system, comprising the steps of:
    a. obtaining a CAD information from the CAD/CAM system, said CAD information pertaining to a design of the material to be cut, said design comprising at least one corner, said at least corner to be cut using a minimal rounded loop;
    b. for the at least one corner, using the CAD information from the CAD/CAM system to determining a minimum linear extension length that allows the CNC machine to decelerate to a feedrate for an arc motion, wherein the arc motion has a smallest possible radius and a corresponding minimal rounded loop based on a machine acceleration limits, thereby cutting said at least one corner using the minimal rounded loop in order to eliminate unwanted dross, sharpen corners and reduce material loss;
    wherein calculating the minimal rounded loop comprises the step of:
    c. calculating a duration of an extension move.

2. The method for cutting a piece of material using a CNC machine coupled to a CAD/CAM system of claim 1, wherein calculating the duration of the extension move comprises calculating a smaller positive root of the quadratic equation $At^2+Bt+C$, where t is a time for the extension move, theta is an interior angle of the corner, $A_{max}$ is a maximum acceleration allowed on machine axes in a cutting plane, $F_{cut}$ is a cutting feedrate, A is $(1+\tan(theta/2)/2)*A_{max}^2$, B is $-(2+\tan(theta/2)/2*Fcut*A_{max}^2$, and C is $F_{cut}^2$.

3. The method for cutting a piece of material using a CNC machine coupled to a CAD/CAM system of claim 2, wherein said CNC machine is at least one of the following: a plasma cutting machine, a laser cutting machine, a waterjet cutting machine.

4. The method for cutting a piece of material using a CNC machine coupled to a CAD/CAM system of claim 1, wherein said minimal rounded loop is a fish-tail corner, in which triangles are used instead of loops.

5. The method for cutting a piece of material using a CNC machine coupled to a CAD/CAM system of claim 4, wherein calculating the linear extension length E comprises $(F_{cut}^2-F_{ss}^2)/(2*A_{max})$, wherein $F_{ss}$ is the feedrate at or below which machine axes in the cutting plane can start or stop instantaneously without losing position, $A_{max}$ is the maximum acceleration allowed on machine axes in the cutting plane, and $F_{cut}$ is the cutting feedrate.

6. The method for cutting a piece of material using a CNC machine coupled to a CAD/CAM system of claim 2, where the cutting feedrate remains constant for the corner loop, wherein calculating the radius R comprises $F_{cut}^2/A_{max}$, wherein $A_{max}$ is the maximum acceleration allowed on machine axes in the cutting plane, and $F_{cut}$ is the cutting feedrate.

7. A method for cutting a corner of a piece of material using a CNC machine coupled to a CAD/CAM system, comprising the steps of:
    a. obtaining a CAD information from the CAD/CAM system, said CAD information pertaining to a design of the material to be cut, said design comprising at least one corner, said at least corner to be cut using a rounded loop;
    b. for the at least one corner, using the CAD information from the CAD/CAM system to determining a minimum linear extension length that allows the CNC machine to decelerate to a feedrate for an arc motion, wherein the arc motion has a smallest possible radius and a corresponding minimal rounded loop based on a machine acceleration limits, thereby cutting said at least one corner using the minimal rounded loop in order to eliminate unwanted dross, sharpen corners and reduce material loss;

wherein calculating the minimal rounded loop comprises the step of:

c. calculating an arc motion feedrate.

8. The method for cutting a piece of material using a CNC machine coupled to a CAD/CAM system of claim 7, wherein calculating the arc motion feedrate $F_{arc}$ comprises $F_{cut}-A_{max}*t$, where t is a time for the extension move, $A_{max}$ is a maximum acceleration allowed on machine axes in a cutting plane, and $F_{cut}$ is a cutting feedrate.

9. The method for cutting a piece of material using a CNC machine coupled to a CAD/CAM system of claim 7, wherein said CNC machine is at least one of the following: a plasma cutting machine, a laser cutting machine, a waterjet cutting machine.

10. A method for cutting a corner of a piece of material using a CNC machine coupled to a CAD/CAM system, comprising the steps of:

a. obtaining a CAD information from the CAD/CAM system, said CAD information pertaining to a design of the material to be cut, said design comprising at least one corner, said at least corner to be cut using a rounded loop;

b. for the at least one corner, using the CAD information from the CAD/CAM system to determining a minimum linear extension length that allows the CNC machine to decelerate to a feedrate for an arc motion, wherein the arc motion has a smallest possible radius and a corresponding minimal rounded loop based on a machine acceleration limits, thereby cutting said at least one corner using the minimal rounded loop in order to eliminate unwanted dross, sharpen corners and reduce material loss;

wherein calculating the minimal rounded loop comprises the step of:

c. calculating a linear extension length.

11. The method for cutting a piece of material using a CNC machine coupled to a CAD/CAM system of claim 10, wherein calculating the linear extension length E comprises $(F_{cut}^2-F_{arc}^2)/(2*A_{max})$, where $F_{cut}$ is a cutting feedrate, $F_{arc}$ is $F_{cut}-A_{max}*t$, t is a time for the extension move, and $A_{max}$ is a maximum acceleration allowed on machine axes in a cutting plane.

12. The method for cutting a piece of material using a CNC machine coupled to a CAD/CAM system of claim 10, wherein said CNC machine is at least one of the following: a plasma cutting machine, a laser cutting machine, a waterjet cutting machine.

13. A method for cutting a corner of a piece of material using a CNC machine coupled to a CAD/CAM system, comprising the steps of:

a. obtaining a CAD information from the CAD/CAM system, said CAD information pertaining to a design of the material to be cut, said design comprising at least one corner, said at least corner to be cut using a rounded loop;

b. for the at least one corner, using the CAD information from the CAD/CAM system to determining a minimum linear extension length that allows the CNC machine to decelerate to a feedrate for an arc motion, wherein the arc motion has a smallest possible radius and a corresponding minimal rounded loop based on a machine acceleration limits, thereby cutting said at least one corner using the minimal rounded loop in order to eliminate unwanted dross, sharpen corners and reduce material loss;

wherein calculating the minimal rounded loop comprises the step of:

c. calculating an arc motion radius.

14. The method for cutting a piece of material using a CNC machine coupled to a CAD/CAM system of claim 13, wherein calculating the arc motion radius R comprises $F_{arc}^2/A_{max}$, where $F_{arc}$ is $F_{cut}-A_{max}*t$, $A_{max}$ is a maximum acceleration allowed on machine axes in a cutting plane, t is a time for the extension move, and $F_{cut}$ is a cutting feedrate.

15. The method for cutting a piece of material using a CNC machine coupled to a CAD/CAM system of claim 13, wherein said CNC machine is at least one of the following: a plasma cutting machine, a laser cutting machine, a waterjet cutting machine.

* * * * *